US011401736B2

(12) United States Patent
Hu

(10) Patent No.: US 11,401,736 B2
(45) Date of Patent: Aug. 2, 2022

(54) SYSTEMS AND METHODS FOR CONTROLLING A LOCK

(71) Applicant: BEIJING QISHENG SCIENCE AND TECHNOLOGY CO., LTD., Beijing (CN)

(72) Inventor: Zhifeng Hu, Beijing (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 607 days.

(21) Appl. No.: 16/407,342

(22) Filed: May 9, 2019

(65) Prior Publication Data

US 2019/0292815 A1 Sep. 26, 2019

Related U.S. Application Data

(63) Continuation of application No. PCT/CN2017/110169, filed on Nov. 9, 2017.

(30) Foreign Application Priority Data

Nov. 25, 2016 (CN) .......................... 201611059241.9
Dec. 14, 2016 (CN) .......................... 201611151128.3
(Continued)

(51) Int. Cl.
*E05B 71/00* (2006.01)
*B62H 5/14* (2006.01)
(Continued)

(52) U.S. Cl.
CPC ............. *E05B 71/00* (2013.01); *B62H 5/147* (2013.01); *E05B 47/023* (2013.01); *G07C 9/00* (2013.01);
(Continued)

(58) Field of Classification Search
CPC .. E05B 71/00; E05B 47/023; E05B 2047/002; E05B 2047/0058; B62H 5/147;
(Continued)

(56) References Cited

U.S. PATENT DOCUMENTS 5,873,276 A * 2/1999 Dawson ............. G07C 9/00912
70/284
6,081,199 A * 6/2000 Hogl .................. G07C 9/00912
70/278.1
(Continued)

FOREIGN PATENT DOCUMENTS

CN          1924271 A      3/2007
CN        102052015 A      5/2011
(Continued)

OTHER PUBLICATIONS

The Extended European Search Report in European Application No. 17872954.7 dated Oct. 22, 2019, 8 pages.
(Continued)

*Primary Examiner* — Nam V Nguyen
(74) *Attorney, Agent, or Firm* — Metis IP LLC

(57) ABSTRACT

A system includes a storage device storing a set of instructions and at least one processor in communication with the storage device. When executing the instructions, the at least one processor is configured to cause the system to obtain a request to close a lock such that the lock is in a locked status, and actuate a control device to cause a locking mechanism of the lock to move toward a first position. The at least one processor may also cause the system to determine whether operation information of the lock satisfies a condition relating to an operation of the lock, and actuate the control device to cause the locking mechanism to move to the first position
(Continued)

or a second position based on a result of the determination as to whether the operation information of the lock satisfies the condition.

20 Claims, 11 Drawing Sheets

(30) Foreign Application Priority Data

Dec. 14, 2016 (CN) .......................... 201611153363.4
Dec. 14, 2016 (CN) .......................... 201611155484.2

(51) Int. Cl.
  *E05B 47/02* (2006.01)
  *G07C 9/00* (2020.01)
  *E05B 47/00* (2006.01)

(52) U.S. Cl.
  CPC . *E05B 2047/002* (2013.01); *E05B 2047/0058* (2013.01); *G07C 9/00309* (2013.01); *G07C 2209/62* (2013.01)

(58) Field of Classification Search
  CPC ... G07C 9/00; G07C 9/00309; G07C 2209/62
  USPC ............................ 340/5.31, 5.5, 5.72; 70/263
  See application file for complete search history.

(56) References Cited

U.S. PATENT DOCUMENTS

| | | | |
|---|---|---|---|
| 6,525,644 B1* | 2/2003 | Stillwagon | G07C 9/00309 340/5.9 |
| 9,077,716 B2* | 7/2015 | Myers | G07C 9/27 |
| 9,646,442 B2* | 5/2017 | Chan | G07C 9/00309 |
| 9,728,022 B2* | 8/2017 | Gengler | E05B 67/22 |
| 10,176,656 B2* | 1/2019 | Gengler | G07C 9/00571 |
| 10,255,740 B2* | 4/2019 | Duan | H04L 63/083 |
| 10,679,439 B2* | 6/2020 | Han | G07C 9/00182 |
| 2002/0165929 A1* | 11/2002 | McLaughlin | H04L 41/0803 709/213 |
| 2004/0070489 A1* | 4/2004 | Ueda | E05B 85/01 340/5.61 |
| 2007/0296563 A1* | 12/2007 | Higuchi | B60R 25/24 340/426.36 |
| 2008/0012683 A1* | 1/2008 | Ito | G07C 9/00817 340/5.22 |
| 2015/0240531 A1* | 8/2015 | Blust | E05B 65/46 340/5.5 |
| 2016/0104333 A1 | 4/2016 | Chan et al. | |
| 2016/0217637 A1 | 7/2016 | Gengler et al. | |
| 2017/0043826 A1* | 2/2017 | Li | B62J 45/412 |
| 2018/0018840 A1 | 1/2018 | Xia et al. | |

FOREIGN PATENT DOCUMENTS

| | | |
|---|---|---|
| CN | 102226365 A | 10/2011 |
| CN | 102800140 A | 11/2012 |
| CN | 103679871 A | 3/2014 |
| CN | 103927809 A | 7/2014 |
| CN | 103953222 A | 7/2014 |
| CN | 104021611 A | 9/2014 |
| CN | 204056063 U | 12/2014 |
| CN | 104268964 A | 1/2015 |
| CN | 104477278 A | 4/2015 |
| CN | 104670152 A | 6/2015 |
| CN | 104853050 A | 8/2015 |
| CN | 204688261 U | 10/2015 |
| CN | 204993549 U | 1/2016 |
| CN | 105469471 A | 4/2016 |
| CN | 105501178 A | 4/2016 |
| CN | 105545123 A | 5/2016 |
| CN | 105551150 A | 5/2016 |
| CN | 205292548 U | 6/2016 |
| CN | 205375678 U | 7/2016 |
| CN | 205417866 U | 8/2016 |
| CN | 205601973 U | 9/2016 |
| EP | 1760232 A2 | 3/2007 |
| EP | 2514658 A2 | 10/2012 |
| JP | 2004136765 A | 5/2004 |
| JP | 2004224313 A | 8/2004 |
| KR | 101211661 B1 | 12/2012 |
| WO | 2016061631 A1 | 4/2016 |

OTHER PUBLICATIONS

The Second Office Action in Chinese Application No. 201780070724.5 dated Jul. 14, 2021, 27 pages.
First Office Action in Chinese Application No. 201611153363.4 dated Aug. 29, 2018, 27 pages.
First Office Action in Chinese Application No. 201611151128.3 dated Jun. 27, 2018, 8 pages.
International Search Report in PCT/CN2017/110169 dated Feb. 24, 2018, 4 pages.
Written Opinion in PCT/CN2017/110169 dated Feb. 24, 2018, 4 pages.

* cited by examiner

SYSTEMS AND METHODS FOR CONTROLLING A LOCK

CROSS-REFERENCE TO RELATED APPLICATION

This application is a Continuation of International Application No. PCT/CN2017/110169, filed on Nov. 9, 2017, which claims priority to Chinese Patent Application No. 201611059241.9, filed on Nov. 25, 2016, Chinese Patent Application No. 201611153363.4, filed on Dec. 14, 2016, Chinese Patent Application No. 201611155484.2, filed on Dec. 14, 2016, and Chinese Patent Application No. 201611151128.3, filed on Dec. 14, 2016. Each of the above-referenced applications is expressly incorporated herein by reference in their entireties.

TECHNICAL FIELD

The present disclosure generally relates to security systems, and more particularly, to systems and methods for controlling a lock in the security systems.

BACKGROUND

A lock is an important tool to secure a device (e.g., a door, a bicycle, a drawer). Thus, it may be desirable to develop mechanisms to control the lock efficiently and better secure a device that needs to be secured.

SUMMARY

According to an aspect of the present disclosure, a system may include a lock, a control device, a storage device storing a set of instructions, and at least one processor in communication with the storage device. The lock may include a locking mechanism configured to move between a first position and a second position. The lock may have a locked status under which the locking mechanism is in the first position and an open status under which the locking mechanism is in the second position. The control device may cause the locking mechanism to move between the first position and the second position. When executing the instructions, the at least one processor may be configured to cause the system to obtain a request to close the lock such that the lock is in the locked status, and actuate the control device to cause the locking mechanism to move toward the first position. The at least one processor may also cause the system to obtain operation information of the lock during the movement of the locking mechanism toward the first position, and determine whether the operation information of the lock satisfies a condition relating to an operation of the lock. The at least one processor may further cause the system to actuate the control device to cause the locking mechanism to move to the first position or the second position based on a result of the determination as to whether the operation information of the lock satisfies the condition.

In some embodiments, the system may further include a status detection device configured to determine whether the lock is in the open status or locked status. The at least one processor may also cause the system to actuate the status detection device to determine whether the lock is in the locked status, and actuate the control device to cause the locking mechanism to move toward the first position based on a result of the determination that the lock is not in the locked status.

In some embodiments, the system may further include an obstacle detection device configured to detect whether an obstacle is present in a pathway of the locking mechanism between the first position and the second position. The at least one processor may also cause the system to actuate the obstacle detection device to detect whether an obstacle is present in the pathway of the locking mechanism between the first position and the second position, and actuate the control device to close the lock in response to a result of the detection that no obstacle is present in the pathway between the first position and the second position.

In some embodiments, the at least one processor may also cause the system to generate a warning in response to a result of the detection that an obstacle is present in the pathway of the locking mechanism.

In some embodiments, the at least one processor may also cause the system to transmit a message indicating that the lock is open or locked to a terminal device in response to a result of the determination that the operation information of the lock satisfies the condition In some embodiments, the at least one processor may also cause the system to actuate the status detection device to determine whether the lock is in the locked status, and transmit a message indicating that the lock is locked to a terminal device in response to a result of the determination that the lock is in the locked status.

In some embodiments, the at least one processor may also cause the system to obtain a request to abort the request to close the lock and determine that the operation information of the lock satisfies the condition based on the obtained request to abort.

In some embodiments, the at least one processor may also cause the system to determine whether the number of times of actuating the control device to close the lock equals or exceeds a threshold number, and determine the operation information of the lock satisfies the condition based on a result the determination that the number of times of actuating the control device to close the lock equals or exceeds the threshold number.

In some embodiments, the at least one processor may also cause the system to determine whether a duration of closing the lock equals or exceeds a threshold period, and determine the operation information of the lock satisfies the condition based on a result the determination that the duration of closing the lock equals or exceeds the threshold period.

In some embodiments, the at least one processor may also cause the system to obtain a reference time from a timing device, and determine a current time based on the obtained reference time. The at least one processor may further cause the system to determine whether the current time satisfies a condition to close the lock and generate the request to close the lock based on a result of the determination that the current time satisfies the condition to close the lock.

In some embodiments, the control device may include at least one of a motor, a worm, or a worm gear.

In some embodiments, the status detection device may include a first switch. The at least one processor may further cause the system to determine whether at least a part of the lock mechanism is physically connected to the first switch, and determine that the lock may be in the locked status based on a result of the determination that at least a part of the lock mechanism may be physically connected to the first switch.

In some embodiments, the status detection device may further include a second switch. The at least one processor may further cause the system to determine whether at least a part of the lock mechanism is physically connected to the second switch, and determine that the lock is in the open status based on a result of the determination that at least a part of the lock mechanism may be physically connected to the second switch.

In some embodiments, the status detection device may include a switch. The at least one processor may further cause the system to determine whether at least a part of the lock mechanism is physically connected to the switch, and determine that the lock may be in the open status based on a result of the determination that at least a part of the lock mechanism may be not physically connected to the switch.

According to another aspect of the present disclosure, a computer-implemented method may include one or more of the following operations performed by at least one processor. The method may include obtaining a request to close a lock such that the lock is in a locked status. The lock may include a locking mechanism configured to move between a first position and a second position. The lock may have the locked status under which the locking mechanism is in the first position and an open status under which the locking mechanism is in the second position. The method may also include actuating a control device to cause the locking mechanism to move toward the first position and obtaining operation information of the lock during the movement of the locking mechanism toward the first position. The method may further include determining whether the operation information of the lock satisfies a condition relating to an operation of the lock, and actuating the control device to cause the locking mechanism to move to the first position or the second position based on a result of the determination as to whether the operation information of the lock satisfies the condition.

According to yet another aspect of the present disclosure, a non-transitory computer-readable storage medium storing instructions that, when executed by at least one processor of a system, cause the system to perform a method. The method may include obtaining a request to close a lock such that the lock is in a locked status. The lock may include a locking mechanism configured to move between a first position and a second position. The lock may have the locked status under which the locking mechanism is in the first position and an open status under which the locking mechanism is in the second position. The method may also include actuating a control device to cause the locking mechanism to move toward the first position and obtaining operation information of the lock during the movement of the locking mechanism toward the first position. The method may further include determining whether the operation information of the lock satisfies a condition relating to an operation of the lock, and actuating the control device to cause the locking mechanism to move to the first position or the second position based on a result of the determination as to whether the operation information of the lock satisfies the condition.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
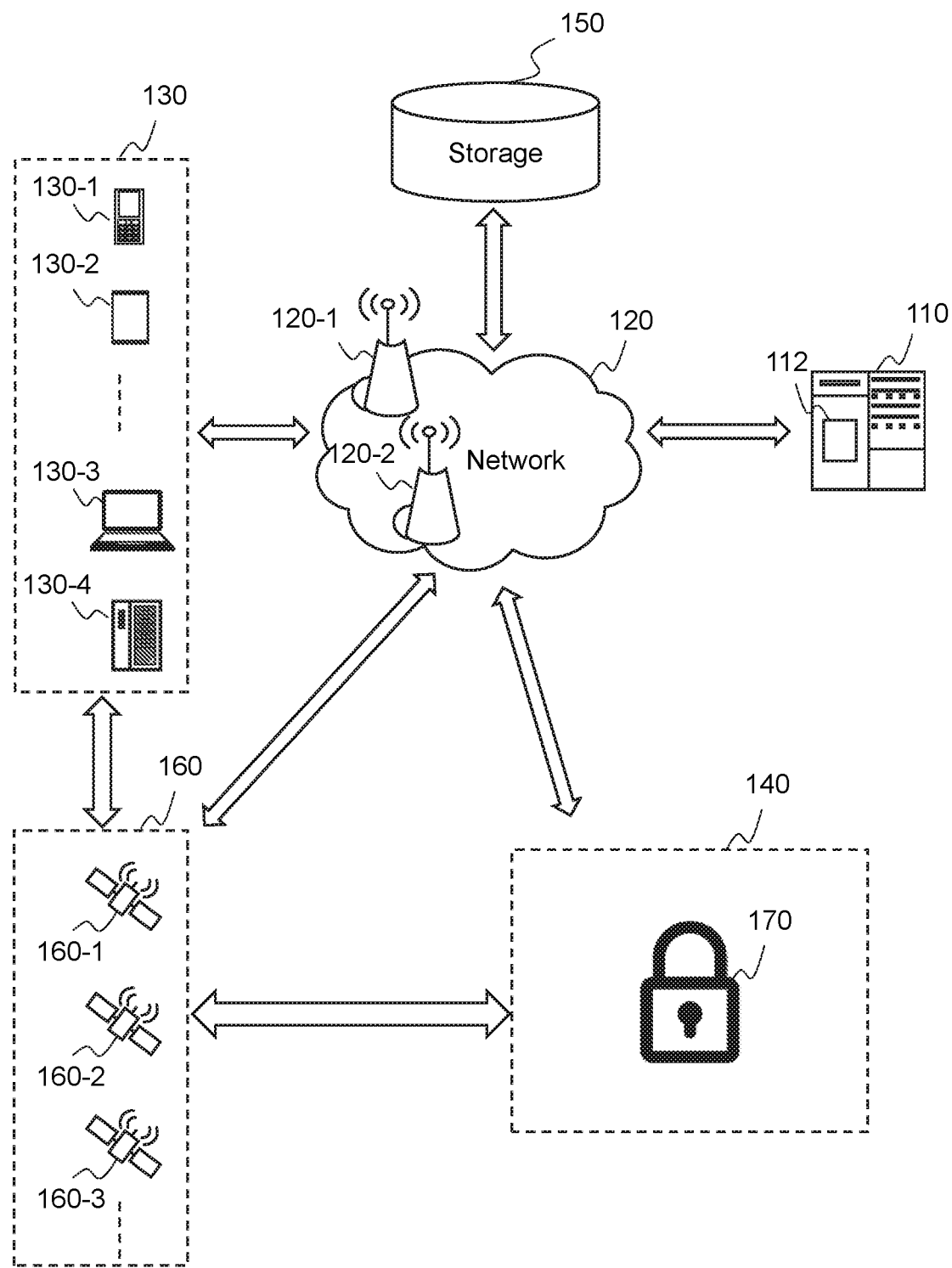
FIG. 1 is a schematic diagram illustrating an exemplary security system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular exemplary embodiments only and is not intended to be limiting. As used herein, the singular forms "a," "an," and "the" may be intended to include the plural forms as well, unless the context expressly indicates otherwise. It will be further understood that the terms "comprise," "comprises," and/or "comprising," "include," "includes," and/or "including," when used in the present disclosure, specify the presence of stated features, integers, steps, operation, elements, and/or components, but do not preclude the presence or addition of one or more other features, integers, steps, operation, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for illustration and description only, and are not intended to limit the scope of the present disclosure. It is understood that the drawings are not to scale.

It will be understood that the term "system," "engine," "unit," and/or "module" used herein are one method to distinguish different components, elements, parts, sections, or assemblies of different levels in ascending order. However, the terms may be displaced by other expressions if they achieve the same purpose.

It will be understood that when a unit, engine, or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

The flowcharts used in the present disclosure illustrate operation that systems implement according to some embodiments of the present disclosure. It is to be expressly understood, the operation of the flowcharts may be implemented not in order. Conversely, the operation may be implemented in inverted order, or simultaneously. Moreover, one or more other operation may be added to the flowcharts. One or more operations may be omitted from the flowcharts.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

The present disclosure relates to systems and methods for controlling a lock. The lock may be used to secure a device (e.g., a bicycle, a door) based on the information related to a security system. The systems may perform the methods to receive a request to close the lock. The systems may perform the methods to actuate a control device to close the lock. The control device may drive a locking mechanism of the lock to move toward a certain position at which the lock is in the locked status. During the movement of the locking mechanism toward the certain position, the systems may perform the methods to acquire operation information of the lock and determine whether the operation information of the lock satisfies a condition relating to an operation of the lock. In response to the determination as to whether the operation information of the lock satisfies the condition, the systems may perform the methods to actuate the control device to open or close the lock.

FIG. 1 is a schematic diagram illustrating an exemplary security system 100 according to some embodiments of the present disclosure. The security system 100 may include a server 110, a network 120, one or more terminal devices 130, a device 140, a storage 150, a positioning device 160, and a lock 170. The security system 100 may secure the device 140 by the lock 170 by implementing the methods and/or processes disclosed in the present disclosure. In some embodiments, the device 140 to be secured may be a bicycle in a bicycle sharing system. The bicycle sharing system may provide a bicycle sharing service allowing a user to use a bicycle for a ride. When the user finishes the ride and wants to return the bicycle, the user may leave the bicycle in any area where the parking of the bicycle is permitted and lock the bicycle. The bicycle may then be ready for a next user.

The server 110 may communicate with the terminal device 130, the device 140, and/or the lock 170 to provide various functionalities of the security system 100. In some embodiments, the server 110 may receive a request associated with the device 140 from the terminal device 130 via, for example, the network 120. For example, the server 110 may receive a request to lock the device 140 from the terminal device 130 via, for example, the network 120. As another example, the device 140 may be a bicycle in a bicycle sharing system and the request may be a service request to borrow (or rent) the bicycle. The service request may include order information relating to the ride and/or the bicycle, including, for example, a bicycle type, a departing place, a destination, mileage, a route, or the like, or any combination thereof. The service request may also include the information relating the user (e.g., the user account information) and/or the terminal device 130 (e.g., the location of the terminal device 130).

The server 110 may also transmit information to the terminal device 130, the device 140, and/or the lock 170. For instance, the server 110 may transmit to a device 140 and/or the lock 170 an instruction to lock the device 140, an instruction to unlock the device 140, and/or the information related to the device 140 (e.g., the information indicating whether the device 140 is locked).

In some embodiments, the device 140 may be a bicycle in a bicycle sharing system. The server 110 may determine one or more bicycles in response to a service order received from the terminal device 130 and transmit the information relating to the one or more bicycles to the terminal device 130, including, for example, the locations of the one or more bicycles, the fees for the ride (e.g., the total fees for the ride, the hourly rate for the ride), or the like, or a combination thereof. The server 110 may also determine a hotspot area based on historical data obtained from the terminal device 130, the bicycle, and/or the storage 150. The hotspot area may be an area where bicycles are in high demand. The historical data may include the number of searches for a bicycle in an area. The historical data may also include data relating to historical service orders (e.g., the number of times that the bicycles have been used in an area). The historical data may further include information provided by users via the terminal devices 130 (e.g., advice to place more bicycles in some area submitted by users). The server 110 may also provide a service fee management. The server 110 may determine the cost of a ride based on a monthly membership, a quarterly membership, a season (e.g., spring, summer) membership, an annual membership, or fees per ride.

In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120. For example, the server 110 may access information and/or data stored in the terminal device 130, the device 140, and/or the storage 150 via the network 120. As another example, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing engine 112. The processing engine 112 may process information and/or data related to performing one or more functions in the present disclosure. For example, the processing engine 112 may process operation information of the lock 170 to determine the status of the lock. In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the security system 100 (e.g., the server 110, the terminal device 130, the device 140, the storage 150, or the lock 170) may transmit information and/or data to another component(s) in the security system 100 via the network 120. For example, the server 110 may access and/or obtain data of a plurality of devices 140 from the storage 150 via the network 120. As another example, the server 110 may transmit a message indicating whether the device 140 is locked to the terminal device 130 via the network 120. As yet another example, the positioning device 160 may transmit positioning information to the terminal device 130 via the network 120.

In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the security system 100 may be connected to the network 120 to exchange data and/or information.

In some embodiments, a user may be an owner of the terminal device 130. The terminal device 130 may receive input from the user and transmit the information relating to the input to the server 110 via the network 120. The terminal device 130 may also receive information from the server 110 via the network 120. For example, the terminal device 130 may receive input from the user relating to the device 140 to the server 110, and/or receive information or instructions from the server 110. Merely by way of example, a user may input a request for maintenance service when he or she fails to lock the device 140. The terminal device 130 may be configured to transmit the request for maintenance service to the server 110.

In some embodiments, the device 140 may be a bicycle in a bicycle sharing system. The terminal device 130 may be configured to transmit a service request to the server 110 for searching for bicycles near the location of the terminal device 130. The server 110 may determine one or more bicycles (e.g., the locations of the bicycles, number of the bicycles) near the location of the terminal device 130 according to and in response to the service request. The server 110 may also transmit information relating to the determined one or more bicycles to the terminal device 130 via the network 120. The information of the determined one or more bicycles may be displayed on the terminal device 130 associated with an electronic map. The terminal device 130 may receive input from the user indicating a selected bicycle from the bicycles displayed on the terminal device 130, which may be transmitted to the server 110. The terminal device 130 may also provide a walking navigation for guiding the user to the location of the selected bicycle. As another example, the terminal device 130 may receive input from the user for reserving a bicycle and transmit the information to the server 110. As yet another example, the terminal device 130 may transmit feedback information provided by the user to the server 110. The feedback information may include the status of the bicycle (e.g., whether any part of the bicycle needs to be repaired), improvement suggestions, etc.

In some embodiments, the terminal device 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, a built-in onboard television, a built-in tablet, etc. In some embodiments, the terminal device 130 may include a signal transmitter and a signal receiver configured to communicate with the positioning device 160 for locating the position of the user and/or the terminal device 130. For example, the terminal device 130 may transmit an instruction to the positioning device 160 to locate the position of the user and/or the terminal device 130.

The device 140 may include any device that needs to be secured. Exemplary devices 140 may include a bicycle, a car, a door, a window, a cabinet, a drawer, a package, a safe box, a luggage, or the like, or any combination thereof. The lock 170 may be configured to lock the device 140. The lock 170 may include any combination of mechanisms to implement the functions thereof. The lock 170 may be a mechanical lock or an electronic lock. The device 140 and the lock 170 may be separate parts that are mechanically connected to each other. For example, the device 140 and the lock 170 may be separate parts and the lock 170 may be mounted on the device 140. Additionally or alternatively, the device 140 and the lock may form an integral device. Details regarding the lock 170 may be found elsewhere in the present disclosure (e.g., FIGS. 4 to 11 and the relevant descriptions thereof).

The device 140 and/or the lock 170 may communicate with the server 110, the network 120, the terminal device 130, and/or the positioning device 160. For example, the device 140 and/or the lock 170 may transmit status information of the device 140 and/or the lock 170 to the server 110 via the network 120. The status information may include a location of the device 140, a locked/unlocked status of the device 140, battery power of the device 140, operation information of lock 170, or the like, or a combination thereof. The server 110 may monitor the device 140 based on the status information. As another example, the device 140 and/or the lock 170 may receive an instruction (e.g., an instruction to lock/unlock the device 140) from the terminal device 130 and/or the server 110. As yet another example, the device 140 may include a signal transmitter and a signal receiver (e.g., a GPS component of the device 140) configured to communicate with the positioning device 160 for locating a position of the device 140.

In some embodiments, the device 140 may be a bicycle. The bicycle may be any type of bicycle including, for example, a unicycle, a bicycle, a tricycle, a tandem, a motor bicycle, an electric bicycle, a moped, etc. The color of a bicycle is not limiting. Merely by way of example, the color of the body of the bicycle may be yellow. In some embodiments, a bicycle may include a lock 170. The bicycle and/or the lock 170 may be identified with a unique symbol. The unique symbol may include a bar code, a quick response (QR) code, a serial number including letters and/or digits, or the like, or any combination thereof. For example, the identification (ID) of a lock 170 may be obtained by scanning the QR code of the lock 170 and/or the QR code of the bicycle through a mobile application of the terminal device 130 or a camera of the terminal device 130 (if any). Merely by way of example, the ID of the lock 170 may be obtained by scanning the QR code of the bicycle through a camera of an iPhone.

The storage 150 may store data and/or instructions. The data may include data related to users, terminal devices 130, device 140, etc. Merely by way of example, the device 140 may be a bicycle of a bicycle sharing system. The data related to the users may include user profiles including for example, names of the users, mobile numbers of the users, ID numbers of the users, types of the users (e.g., annual card users, quarterly card users, or monthly card users), usage records of the users (e.g., riding time, cost), credit rating of the users, historical routes, account balance, etc. The data related to the bicycles may include service conditions of the bicycles (an inactive state, a booking state, on a ride, in a maintenance state, in a loss state), positions of the bicycles, types of the bicycles (e.g., a unicycle, a bicycle, a tricycle, a tandem, a motor bicycle, an electric bicycle), etc. In some embodiments, the storage 150 may store data obtained from the terminal device 130 and/or the device 140. For example, the storage 150 may store log information associated with the terminal device 130. In some embodiments, the storage 150 may store data and/or instructions that the server 110 may execute or use to perform exemplary methods described in the present disclosure.

In some embodiments, the storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The positioning device 160 may determine information associated with an object, for example, one or more of the terminal device 130, or the device 140 (e.g., a bicycle). For example, the positioning device 160 may determine a current time and a current location of the terminal device 130 and/or the device 140. In some embodiments, the positioning device 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, and/or a current time. The location may be in the form of coordinates, such as a latitude coordinate and a longitude coordinate, etc. The positioning device 160 may include one or more satellites, for example, a satellite 160-1, a satellite 160-2, and a satellite 160-3. The satellite 160-1 through 160-3 may determine the information mentioned above independently or jointly. The positioning device 160 may transmit the information mentioned above to the terminal device 130, or the device 140 via the network 120.

In some embodiments, one or more components of the security system 100 may access the data and/or instructions stored in the storage 150 via the network 120. In some embodiments, the storage 150 may be directly connected to the server 110 as a backend storage. In some embodiments, one or more components of the security system 100 (e.g., the server 110, the terminal device 130, or the device 140) may have permissions to access the storage 150. In some embodiments, one or more components of the security system 100 may read and/or modify the information related to the user, and/or the device 140 when one or more conditions are met. For example, the server 110 may read and/or modify one or more users' information after a ride of a bicycle is completed.

In some embodiments, the device 140 may be a bicycle of a bicycle sharing system. The information exchange between one or more components of the security system 100 may be initiated by way of launching the mobile application of the bicycle sharing service on a terminal device 130, requesting a bicycle service, or inputting a query via the terminal device 130 (e.g., searching for a bicycle). The object of the service request may be any product. In some embodiments, the product may include food, medicine, commodity, chemical product, electrical appliance, clothing, car, housing, luxury, or the like, or any combination thereof. In some other embodiments, the product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc.

One of ordinary skill in the art would understand that when an element of the security system 100 performs, the element may perform through electrical signals and/or electromagnetic signals. For example, when a terminal device 130 processes a task, such as making a determination, unlocking a device 140, the terminal device 130 may operate logic circuits in its processor to process such task. When the terminal device 130 transmits out a query (e.g., information relating to a location of a device 140) to the server 110, a processor of the terminal device 130 may generate electrical signals encoding the query. The processor of the terminal device 130 may then transmit the electrical signals to an output port. If the terminal device 130 communicates with the server 110 via a wired network, the output port may be physically connected to a cable, which further transmits the electrical signal to an input port of the server 110. If the terminal device 130 communicates with the server 110 via a wireless network, the output port of the terminal device 130 may be one or more antennas, which convert the electrical signals to electromagnetic signals. Similarly, a device 140 and/or a lock 170 may process a task through operation of logic circuits in its processor, and receive an instruction and/or service order from the server 110 via electrical signals or electromagnet signals. Within an electronic device, such as the terminal device 130, the device 140, the lock 170, and/or the server 110, when a processor thereof processes an instruction, transmits out an instruction, and/or performs an action, the instruction and/or action is conducted via electrical signals. For example, when the processor retrieves data (e.g., a plurality of user profiles) from a storage medium (e.g., the storage 150), it may transmit out electrical signals to a reading device of the storage medium, which may read structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
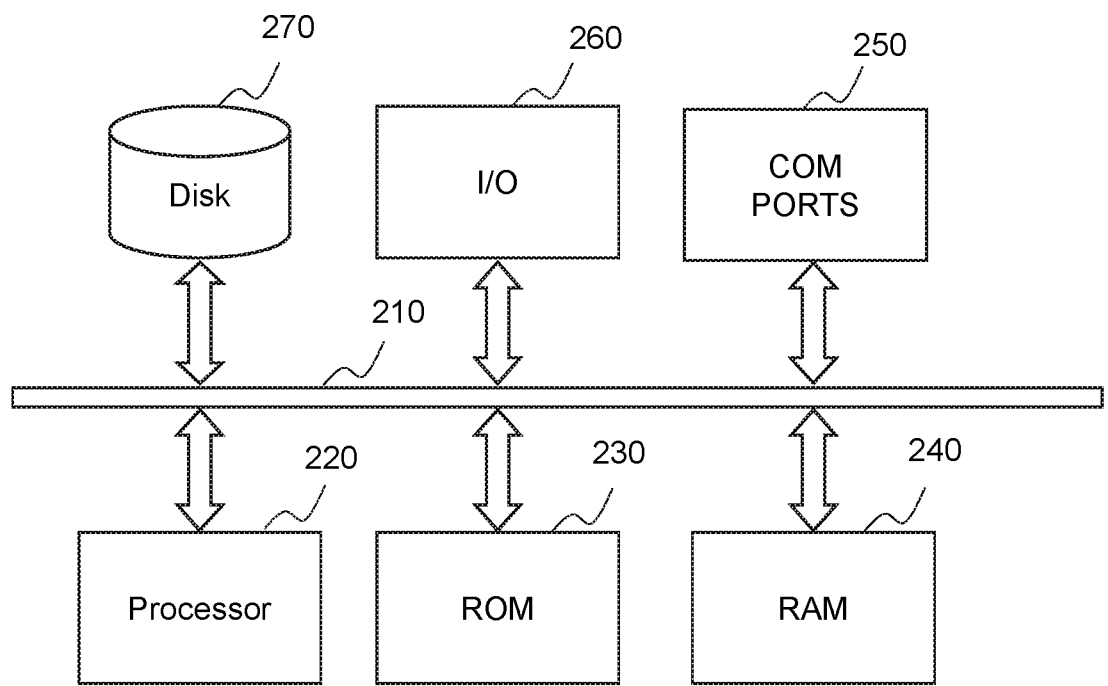
FIG. 2 is a schematic diagram illustrating hardware and/or software components of an exemplary computing device according to some embodiments of the present disclosure.

FIG. 2 a schematic diagram illustrating exemplary hardware and/or software components of a computing device 200 according to some embodiments of the present disclosure. The computing device 200 may be a general purpose computer or a special purpose computer. The computing device 200 may be used to implement any component of the security system 100 as described herein. For example, the processing engine 112 of the server 110, and/or the terminal device 130 may be implemented on the computing device 200, via its hardware, software program, firmware, or a combination thereof. Although only one such computer is shown for convenience, the computer functions related to the security system 100 as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220 for executing program instructions to perform the functions of the server 110 described herein. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operation and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
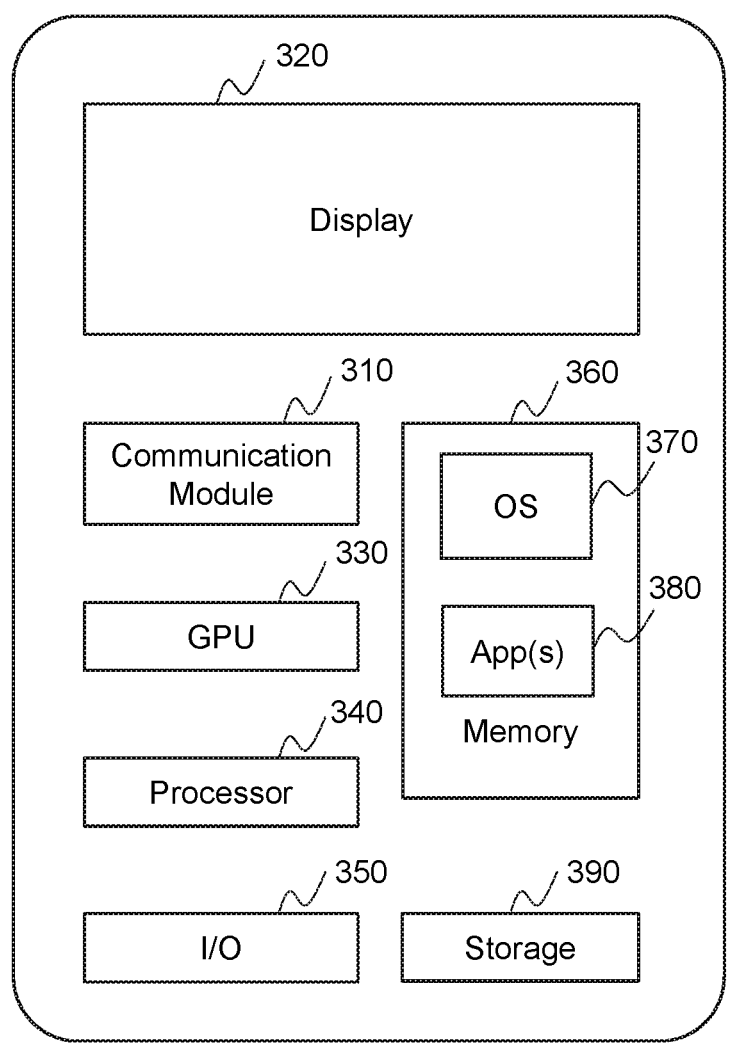
FIG. 3 is a schematic diagram illustrating hardware and/or software components of an exemplary mobile device according to some embodiments of the present disclosure.

FIG. 3 is a schematic diagram illustrating exemplary hardware and/or software components of a mobile device 300 on which a terminal device may be implemented according to some embodiments of the present disclosure. As illustrated in FIG. 3, the mobile device 300 may include a communication module 310, a display 320, a graphic processing unit (GPU) 330, a processor 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable apps for transmitting, receiving and presenting information relating to the status of the device 140 (e.g., the location of the device 140) from the server 110. User interactions with the information stream may be achieved via the I/O 350 and provided to the server 110 and/or other components of the security system 100 via the network 120. In some embodiments, a user may borrow (or rent) a device 140 (e.g., a bicycle) via the mobile device 300. The user may also control the lock 170 of the device 140 via the mobile device 300. For example, the user may input an instruction to close the lock via the mobile device 300.

Figure 4:
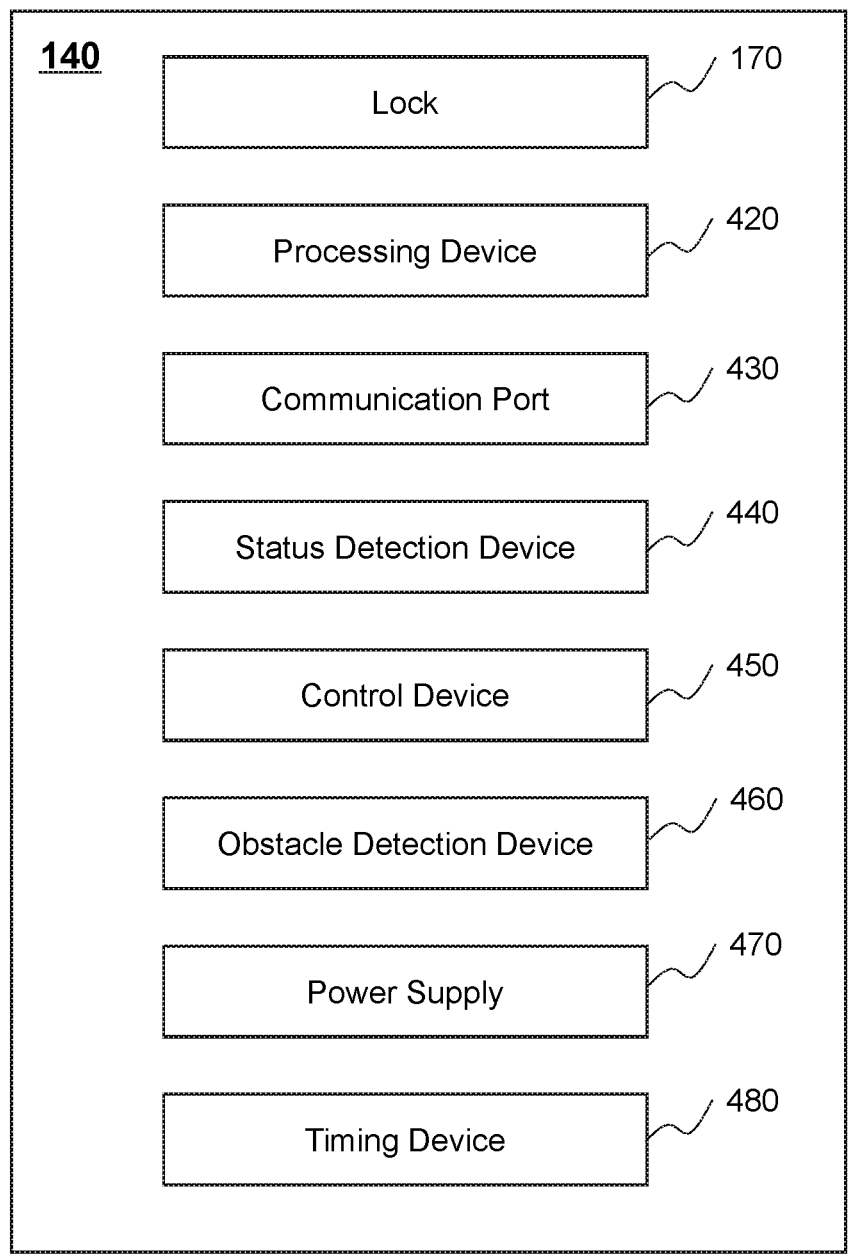
FIG. 4 is a schematic diagram illustrating hardware and/or software components of an exemplary device needs to be secured according to some embodiments of the present disclosure.

FIG. 4 is a schematic diagram illustrating hardware and/or software components of a device 140 needs to be secured according to some embodiments of the present disclosure. The device 140 may include a lock 170, a processing device 420, a communication port 430, a status detection device 440, a control device 450, an obstacle detection device 460, a power supply 470, and a timing device 480.

The lock 170 may be configured to secure the device 140. For example, the device 140 may be a bicycle, and the lock 170 may be configured to lock one or more wheels of the bicycle. In some embodiments, the lock 170 may be configured to secure the bicycle to a fixed object such as a bicycle lock pillar or a rack. The lock 170 may include any combination of mechanisms to implement the functions thereof. For example, the lock 170 may include a mechanical lock or an electronic lock.

In some embodiments, the lock 170 may include a locking mechanism. The locking mechanism may include a lock tongue, a bolt, a lock cylinder, or the like. The lock mechanism may be movable along a predetermined pathway. The status of the lock 170 may change with the movement of the locking mechanism. For example, the locking mechanism may move between a first position and a second position. The lock 170 may have a locked status when the locking mechanism is in the first position. The lock 170 may have an open status when the locking mechanism is in the second position.

The processing device 420 may acquire information and/or instruction related to one or more components of the device 140, including, for example, the lock 170. The processing device 420 may also process the information and/or the instruction. Additionally or alternatively, the processing device 420 may control the operation of other components of the device 140 based on the acquired and/or the processed information and/or instruction. In some embodiments, the processing device 420 may include an acquisition module, a control module, and a processing module. Details regarding the processing device 420 may be found elsewhere in the present disclosure (e.g., FIG. 5 and the relevant descriptions thereof).

In some embodiments, the processing device 420 may include but is not limited to a central processing unit (CPU), an application-specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, or the like, or any combination thereof.

The communication port 430 may facilitate communications between other components of the security system 100, including, for example, the device 140, the terminal device 130, and/or the server 110. The communication port 430 may utilize various wireless technologies such as a cellular communication technology (e.g., GSM, CDMA, 2G, 3G, 4G), a short range radio communication technology (e.g., Bluetooth, NFC, radio frequency (RF), Zigbee), narrow band internet of things (NB-IoT), lower-power wide-area network (LPWAN) (e.g., LoRa), etc.

The status detection device 440 may determine the status of the lock 170. The status detection device 440 may include a first switch. The status detection device 440 may determine the status of the lock 170 by determining whether at least part of the locking mechanism is physically connected to the first switch. Upon a result of the determination that at least part of the locking mechanism is physically connected to the first switch, the status detection device 440 may determine that the lock 170 is in the locked status. On the other hand, upon a result of the determination that at least part of the locking mechanism is not physically connected to the first switch, the status detection device 440 may determine that the lock is not in the locked status (i.e., in the open status).

Additionally or alternatively, the status detection device 440 may include a second switch. The status detection device 440 may determine whether the lock 170 is in the locked status by determining whether at least part of the locking mechanism is physically connected to the second switch. Upon a result of the determination that the at least part of the locking mechanism is physically connected to the second switch, the status detection device 440 may determine that the lock 170 is in the open status.

The control device 450 may control the lock 170. For example, the control device 450 may open the lock 170 (i.e., releasing the device 140) and lock (i.e., locking the device 140) in response to instructions from the server 110 and/or the terminal device 130. In some embodiments, the control device 450 may control the status of the lock 170 via controlling the movement of a locking mechanism of the lock 170. For example, the control device 450 may cause the locking mechanism to move toward a certain position (e.g., the first position corresponding to the locked status of the lock 170, or the second position corresponding to the open status of the lock 170) such that the lock 170 is in a different status. In some embodiments, the control device 450 may include a motor, a worm gear, and a worm. Details regarding the control device 450 may be found elsewhere in the present disclosure (e.g., FIG. 9 and the relevant descriptions).

The obstacle detection device 460 may determine whether an obstacle is present in the pathway of the locking mechanism between the first position and the second position. The obstacle detection device 460 may include a signal emitting device and a signal receiving device. The signal emitting device may emit a signal toward the signal receiving device. The signal may include infrared light, ultraviolet light, laser light, visible light, or the like, or any combination thereof. In some embodiments, the signal emitting device may be mounted in or near the second position corresponding to the open status of the lock 170, and the signal receiver may be mounted in or near the first position corresponding to the locked status of the lock 170. Alternatively, the signal emitting device may be mounted in or near the first position, and the signal receiver may be mounted in or near the second position.

The obstacle detection device 460 may determine whether an obstacle is present in the pathway of the locking mechanism based on a determination as to whether the signal receiving device receives the signal from the signal emitting device. When an obstacle is present in the pathway of the locking mechanism between the first position and the second position, it may completely or partially block the signal from transmitting to the signal receiving device. The obstacle detection device 460 may determine that an obstacle is present in the pathway of the locking mechanism when the signal receiving device receives no or a weak signal. The obstacle detection device 460 may determine that no obstacle is present when the signal receiving device receives the signal or a strong signal.

In some embodiments, the obstacle detection device 460 may be an infrared device including an infrared emitter and an infrared receiver. The infrared emitter may emit an infrared light toward the infrared receiver. The obstacle detection device 460 may determine that an obstacle is present in the pathway of the locking mechanism when the infrared receives no or a weak infrared light. The obstacle detection device 460 may determine that no obstacle is present when the infrared receives the infrared light or strong infrared light.

The power supply 470 may provide the power for operations of components of the device 140 (e.g., the communication port 430, the status detection device 440, the control device 450, and the obstacle detection device 460). The power supply 470 may include a battery charged by solar energy, kinetic energy (e.g., during a ride of the device 140, the battery may be charged), wind energy, mechanical energy, etc. In some embodiments, the power supply 470 may be a 18650 battery.

The timing device 480 may provide a reference time to the processing device 420. In some embodiments, the timing device 480 may include a clock chip and a crystal oscillator. The crystal oscillator may keep track of the current time, and the clock chip may transmit the current time to the processing device 420. The current time may serve as the reference time for the processing device 420.

In some embodiments, the device 140 may include one or more other components, for example, a positioning module (e.g., a GPS device), a display, a moving component (e.g., a pedal, a wheel), a gearing component (e.g., a bicycle chain), an arresting component (e.g., a brake), an alarming component (e.g., a bell), or the like, or any combination thereof. In some embodiments, one or more components may be integrated one component. For example, any one of the processing device 420, the communication port 430, the status detection device 440, the control device 450, the obstacle detection device 460, the power supply 470, and the timing device 480 may be integrated into the lock 170.

It should be noted that the above descriptions of the device 140 are provided for illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure.

Figure 5:
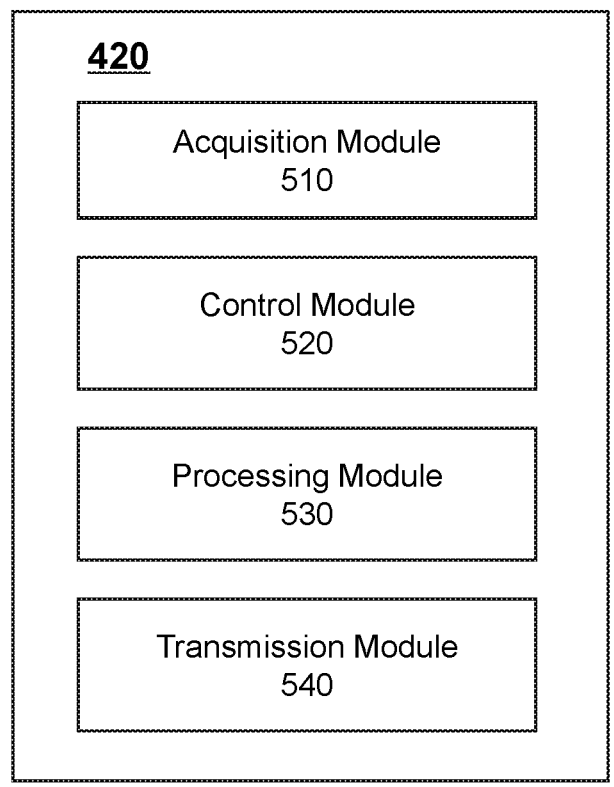
FIG. 5 is a block diagram illustrating an exemplary processing device according to some embodiments of the present disclosure.

FIG. 5 is a block diagram illustrating an exemplary processing device 420 according to some embodiments of the present disclosure. The processing device 420 may include an acquisition module 510, a control module 520, a processing module 530, and a transmission module 540. Each module may be a hardware circuit that is designed to perform the following actions, a set of instructions stored in one or more storage media, and/or a combination of the hardware circuit and the one or more storage media.

The acquisition module 510 may be configured to obtain information and/or instructions. The information and/or instructions may be related to one or more components of the device 140, such as the lock 170. For example, the information may include operation information (e.g., the status of the lock 170) and/or positioning information of the lock 170, time information. The instruction may include a request to close the lock 170, a request to abort the request to close the lock 170, or the like, or any combination thereof.

The acquisition module 510 may acquire the information and/or the instructions from one or more components of the security system 100 (e.g., the storage device 150, the server 110, the terminal device 130) via the communication port 430 and the network 120. Additionally or alternatively, the acquisition module 510 may acquire the information and/or the instructions from one or more components of the device 140, such as the status detection device 440, the obstacle detection device 460, or the like, or any combination thereof.

The control module 520 may control the operation of one or more components of the device 140. For example, the control module 520 may actuate the status detection device 440 to determine the status of the lock 170. As another example, the control module 520 may actuate the obstacle detection device 460 to detect whether an obstacle is present in a pathway of the locking mechanism.

The processing module 530 may be configured to process information related to one or more components of the device 140. For example, the processing module 530 may process information related to the lock 170, such as operation information, positioning information, a result of obstacle detection, a result of status detection, time information, or the like, or any combination thereof. The processing module 530 may process the information and determine an operation of the lock 170. For example, the processing module 530 may determine whether the lock 170 needs to be closed or opened based on the time information and/or the operation information.

The transmission module 540 may be configured to transmit information and/or instructions to other components of the security system 100, such as the server 110, the terminal device 130. For example, the transmission module 540 may transmit a message indicating the status of the lock 170 to the terminal device 130.

In some embodiments, the processing device 420 may include one or more other modules. For example, the processing device 420 may include a storage module to store data generated by the above-mentioned modules. In some embodiments, one or more modules described may be integrated into the processing engine 112. Additionally or alternatively, the processing engine 112 may include one or more similar modules to those of processing device 420 configured to perform at least part of the functions of the processing device 420 disclosed in this application.

It should be noted that the above descriptions of the processing device 420 is provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure.

Figure 6:
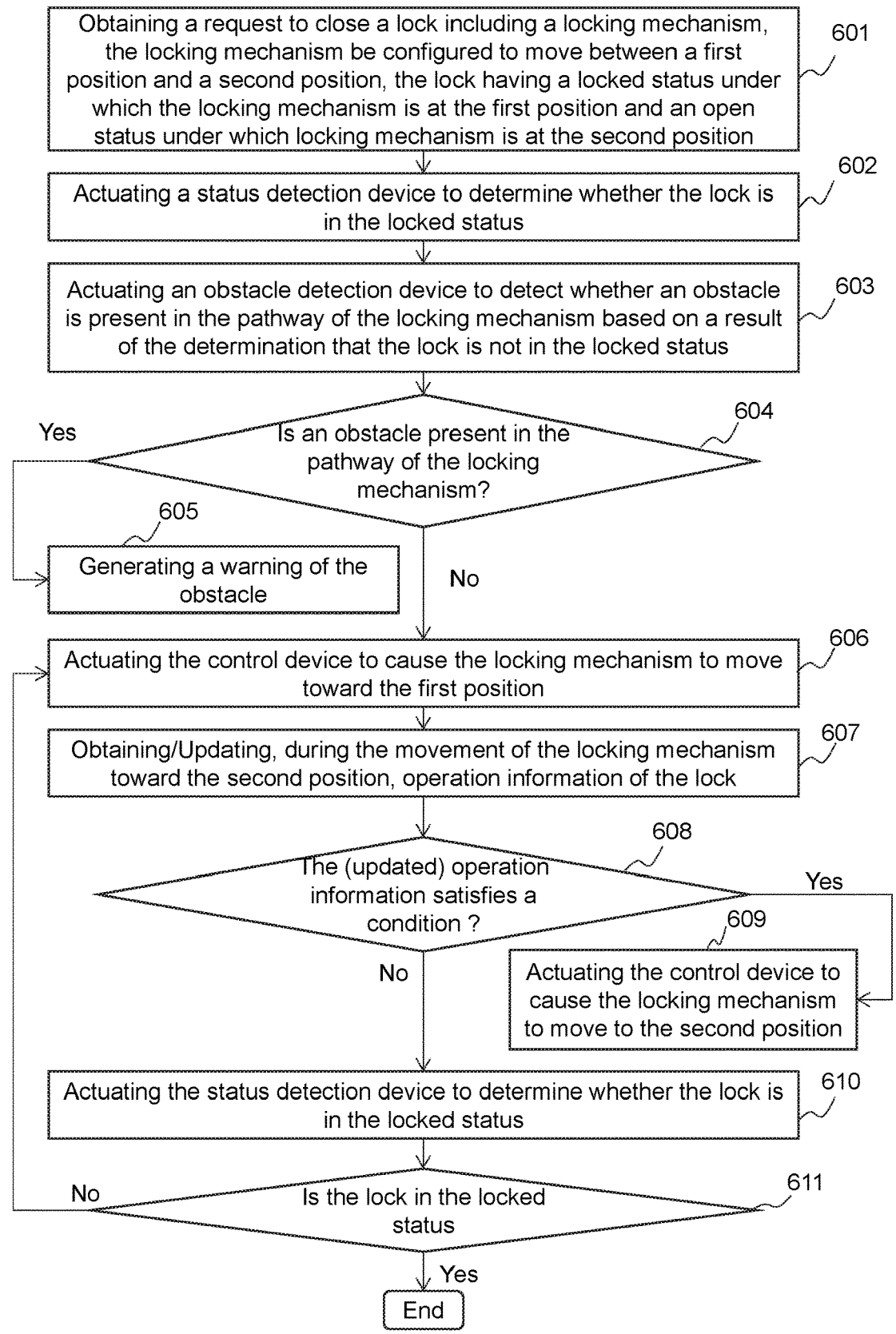
FIG. 6 is a flowchart illustrating an exemplary process for closing a lock according to some embodiments of the present disclosure.

FIG. 6 is a flowchart illustrating an exemplary process for closing a lock according to some embodiments of the present disclosure. Process 600 may be executed by the security system 100. For example, the process 600 may be implemented as a set of instructions (e.g., an application) stored in a storage device (e.g., the storage device 150 and/or a storage device of the device 140). In some embodiments, at least part of the process 600 may be performed by the processing engine 112 (implemented in, for example, the computing device 200 shown in FIG. 2) or the processing device 420 of the device 140. For illustration purposes, the implement of the process 600 on the processing device 420 is described as an example.

In 601, the processing device 420 (e.g., acquisition module 510) may obtain a request to close a lock. In some embodiments, the lock may be a lock 170 of a device 140. The lock 170 may include a locking mechanism, such as a lock tongue, a bolt, a lock cylinder, or the like. The locking mechanism may be movable along a predetermined pathway. The status of the lock 170 may change with the movement of the locking mechanism. For example, the locking mechanism may move between a first position and a second position. The lock 170 may have a locked status when the locking mechanism is in the first position. The lock 170 may have an open status when the locking mechanism is in the second position.

The acquisition module 510 may obtain the request to close the lock from one or more components of the security system 100 (e.g., the server 110, the terminal device 130). For example, the acquisition module 510 may obtain the request to close the lock 170 from a terminal device 130. The request to close the lock 170 may be inputted by a user (e.g., an owner of a device 140 on which the lock 170 is mounted, a borrower of the device 140 on which the lock 170 is mounted) via the terminal device 130. For brevity, the device 140 on which the lock 170 is mounted is referred to as the device 140 herein.

Additionally or alternatively, the acquisition module 510 may obtain the request to close the lock 170 from the processing module 530. The processing module 530 may generate the request to close the lock 170 according to, such as the current time, the operation information of the lock 170, the operation information of the device 140, or the like, or any combination thereof. For example, the processing module 530 may generate the request to close the lock 170 according to the current time. Details regarding the generation of the request to close the lock 170 based on the current time may be found elsewhere in the present disclosure (e.g., FIG. 8 and the relevant descriptions).

As another example, the processing module 530 may generate the request to close the lock 170 according to a duration when the lock 170 or the device 140 stays at one place. A positioning component of the device 140 may collect positioning information of the device 140. The processing module 530 may determine the duration when the lock 170 or the device 140 stays in a place based on the positioning information. The processing module 530 may generate the request to close the lock 170 when, for example, the duration exceeds a period threshold.

In 602, the processing device 420 (e.g., the control module 520) may actuate the status detection device 440 to determine whether the lock 170 is locked (i.e., being in the locked status). The status detection device 440 may include a first switch described in connection with FIG. 4. The status detection device 440 may determine whether the lock 170 is in the locked status by determining whether at least part of the locking mechanism is physically connected to the first switch. Upon a result of the determination that the at least part of the locking mechanism is physically connected to the first switch, the status detection device 480 may determine that the lock 170 is in the locked status. Upon a result of the determination that the at least part of the locking mechanism is not physically connected to the first switch, the status detection device 440 may determine that the lock 170 is not in the locked status. Details regarding the status detection device 440 may be found elsewhere in the present disclosure (e.g., FIG. 4 and the relevant descriptions).

The status detection device 440 may transmit to the processing device 420 (e.g., the processing module 530) the result of the determination as to whether the lock 170 is in the locked status. Upon the result of the determination that the lock 170 is in the locked status, the process 600 may be terminated. Upon the result of the determination that the lock 170 is not in the locked status, the process 600 may proceed to 603.

In 603, the processing device 420 (e.g., the control module 520) may actuate an obstacle detection device 460 to detect whether an obstacle is present in a pathway of the locking mechanism between the first position and the second position. In some embodiments, the obstacle detection device 460 may include a signal emitting device and a signal receiving device configured to perform obstacle detection as described in connection with FIG. 4. Details regarding the obstacle detection device 460 may be found elsewhere in the present disclosure (e.g., FIG. 4 and the relevant descriptions).

The obstacle detection device 460 may transmit to the processing device 420 (e.g., the processing module 530) the result of the determination as to whether an obstacle is present in the pathway of the locking mechanism.

In 604, the processing device 420 (e.g., processing module 530) may determine whether an obstacle is present in the pathway of the locking mechanism between the first position and the second position based on the result of obstacle detection received from the obstacle detection device 460. Upon a result that no obstacle is present in the pathway of the locking mechanism, the process 600 may proceed to 606. On the other hand, upon a result that an obstacle is present in the pathway of the locking mechanism, the process 600 may proceed to 605.

In 605, the processing device 420 may generate a warning of the obstacle. For example, the control module 520 may actuate an alarming device of the lock 170 or the device 140 (not shown in figures) to generate an alarm to warn the obstacle. The alarm may include a sound, a vibration, light, or the like, or any combination thereof. Alternatively or additionally, the transmission module 540 may transmit a message to a terminal device 130 of a user (e.g., an owner of the device 140, a borrower of the device 140) via the communication port 430 and the network 120. The message may indicate that there is the obstacle in the pathway of the locking mechanism. The message may be a text message, a voice message, a phone call, a graph message, or the like, or any combination thereof.

Additionally or alternatively, the transmission module 540 may transmit the message to the server 110. The message may further include information related to the lock 170 (or the device 140), for example, the ID of the device 140, the position information of the device 140. The server 110 may determine a maintenance station close to the lock 170 (or the device 140), and transmit the information of the maintenance station to the lock 170 (or the device 140). The lock 170 (or the device 140) may in return transmit the message to the maintenance station. Alternatively, the transmission module 540 may transmit the message to a maintenance station and/or a maintenance personnel of the security system 100 directly.

In 606, the processing device 420 (e.g., the control module 520) may actuate a control device 450 to cause the locking mechanism to move toward the first position such that the lock 170 may be in the locked status. In some embodiments, the control device 450 may include a motor, a worm gear, and a worm. The motor may drive the worm gear to revolve in a certain direction, which may cause the worm to revolve. The revolution of the worm may cause the locking mechanism to move toward the first position such that the lock 170 is locked. Details regarding the control device 450 may be found elsewhere in the present disclosure (e.g., FIGS. 4 and 9, and the relevant descriptions thereof).

In 607, the processing device 420 (e.g., the acquisition module 510) may obtain operation information of the lock 170 during the movement of the locking mechanism toward the first position. The operation information of the lock 170 may include the number of times of actuating the control device 450 to close the lock 170, a duration of closing the lock 170, and/or a request to abort the request to close the lock 170, or the like, or any combination thereof. The acquisition module 510 may obtain the operation information from a storage device of the security system 100, such as the storage device 150, a storage of the lock 170 or the device 140 (not shown in figures).

In 608, the processing device 420 (e.g., the processing module 530) may determine whether the operation information of the lock 170 satisfies a condition relating to an operation of the lock 170. For example, the operation information may be the number of times of actuating the control device 450 to close the lock 170. The condition may be that the number of times equals or exceeds a threshold number. The processing module 530 may determine that the operation information satisfies the condition when the number of the times of actuating the control device 450 equals or exceeds the threshold number. As another example, the operation information may be a duration of closing the lock 170. The condition may be that the duration of closing the lock 170 equals or exceeds a threshold period. The processing module 530 may determine that the operation information satisfies the condition when the duration of closing the lock 170 equals or exceeds the threshold period. As yet another example, the condition may be that whether a request to abort the request to close the lock 170 is obtained during the movement of the locking mechanism toward the first position. The request to abort may be acquired by, such as the acquisition module 510 and/or the communication port 430. The processing module 530 may determine that the operation information satisfies the condition when the request to abort is obtained during the movement of the locking mechanism toward the first position. In some embodiments, the request to abort may be inputted by a user via a terminal (will be described in connection with FIG. 7).

The condition to close the lock 170 (e.g., the threshold number and/or the threshold duration) may be set manually or be determined by one or more components of the security system 100 (e.g., the processing module 530) according to different situations. The processing device 420 (e.g., the control module 520) may actuate the control device 450 to cause the locking mechanism to move to the first position or the second position based on a result of the determination as to whether the operation information of the lock 170 satisfies the condition. For example, upon a result of the determination that the operation information satisfies the condition, the process 600 may proceed to 609. On the other hand, upon a result of the determination that operation does not satisfy the condition, the process 600 may proceed to 610.

In 609, the processing device 420 (e.g., the control module 520) may actuate the control device 450 to cause the locking mechanism to move to the second position such that the lock 170 is in the open status. Step 609 may be similar to step 606, and the detailed descriptions thereof are not repeated here.

In 610, the processing device 420 (e.g., the control module 520) may actuate the status detection device 440 to determine whether the lock 170 is in the locked status. The status detection device 440 may transmit a result of the status detection to the processing device 420. Step 610 may be similar to step 602, and the detailed descriptions thereof are not repeated here.

In 611, the processing device 420 (e.g., the processing module 530) may determine whether the lock 170 is in the locked status based on the result of status detection received from the status detection device 440. Upon a result that the determination that the lock 170 is in the locked, the process 600 may be terminated. On the other hand, upon a result of the determination that the lock 170 is not in the locked, the process 600 may proceed to 606 until the operation information satisfies the condition, or the lock 170 is in the locked status. For example, the processing device 420 may execute step 604 again to actuate the control device 450 to cause the locking mechanism to move toward the first position. The acquisition module 510 may update the operation information of the lock 170 such as the number of times of actuating the control device 450 to close the lock 170, the duration of closing the lock 170, or the like, or any combination thereof. Further, the processing module 530 may determine whether the updated operation information satisfies the condition. Upon a result of the determination that the updated operation information satisfies the condition, the process 600 may proceed to step 609 such that the lock may be in the open status. On the other hand, upon a result of the determination that the updated operation information does not satisfy the condition, the process 600 may proceed to step 610.

In some embodiments, the process 600 may be accomplished with one or more additional operations and/or without one or more of the operations discussed. For example, one or more steps of steps 602 to 605 may be omitted. The process 600 may proceed to step 606 without the status detection and/or the obstacle detection. Additionally or alternatively, steps 610 or 611 may be omitted. The process may proceed to 606 again after the processing device 420 determines that the operation information does not satisfy the condition in 608.

As another example, after the status detection device 440 detects that the lock 170 is in the locked status in step 602 or step 611, the transmission module 540 may transmit a message to a terminal device 130 of a user (e.g., an owner of the device 140, a borrower of the device 140) via the communication port 430 and the network 120. The message may indicate that the lock 170 is locked.

As yet another example, in response to a result of the determination that the operation information of the lock satisfies the condition in 608, the transmission module 540 may transmit another message indicating that the lock 170 is open or locked to one or more components of the security system 100. When the processing module 530 determines that operation information of the lock satisfies the condition, the transmission module 540 may transmit a message indicating that the lock 170 is open to a terminal device 130 of a user (e.g., an owner of the device 140, a borrower of the device 140). Additionally or alternatively, when the processing module 530 determines that the number of times of actuating the control device 450 to close the lock equals or exceeds a threshold number, or the duration of closing the lock 170 equals or exceeds a threshold period in step 608, the transmission module 540 may transmit the message to a maintenance station, a maintenance personnel, and/or the server 110. The message may indicate that the lock 170 is in the open status and might break down. The message may also include the information of the lock 170 (or the device 140), for example, the ID of the device 140, the position information of the device 140. The message may be similar to the message as described in connection with step 605, and the detailed descriptions are not repeated here.

It should be noted that the above description of the process 600 is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
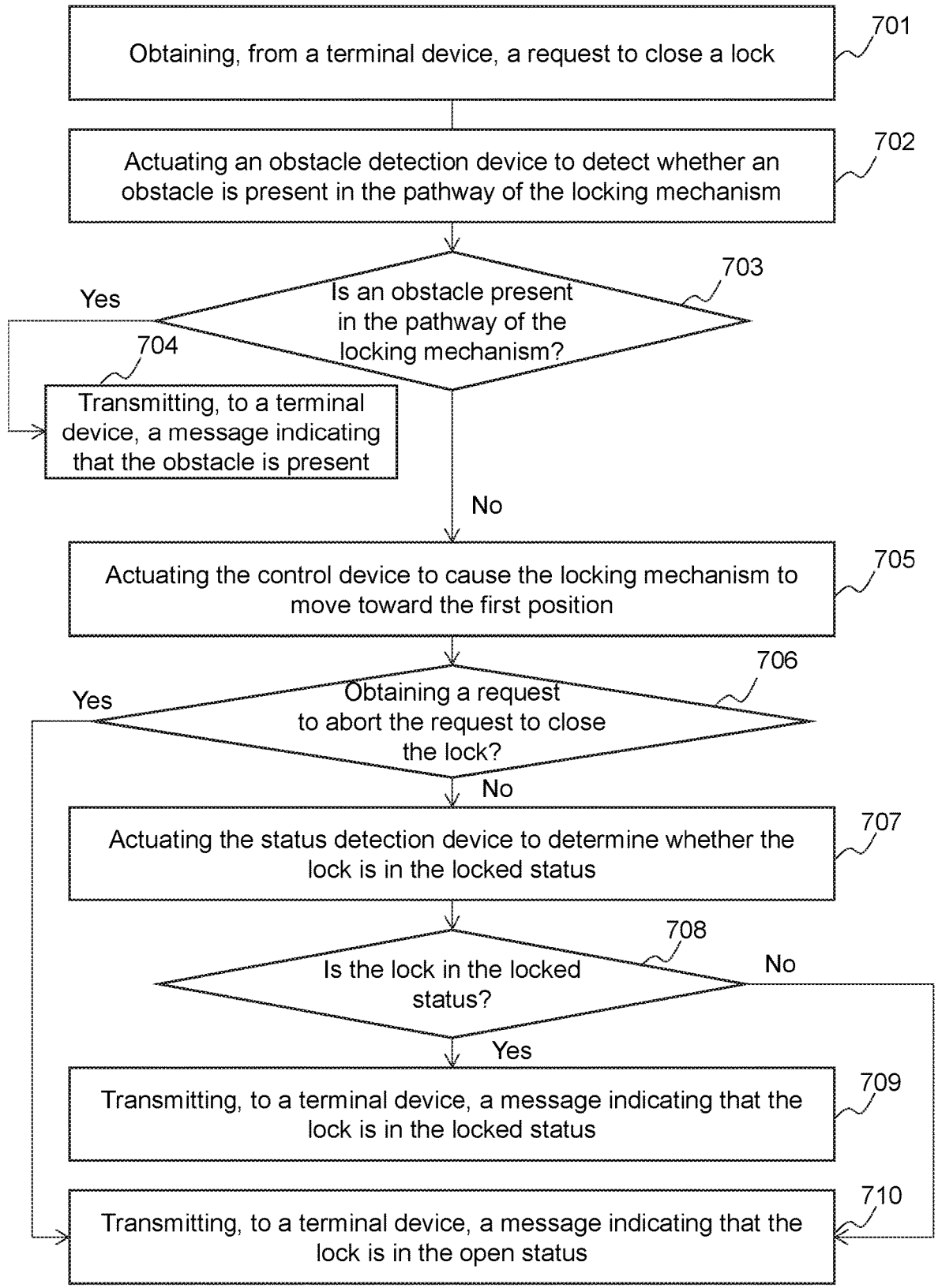
FIG. 7 is a flowchart illustrating an exemplary process for closing a lock according to some embodiments of the present disclosure.

FIG. 7 is a flowchart illustrating an exemplary process for closing a lock according to some embodiments of the present disclosure. In some embodiments, process 700 may be an embodiment of the process 600 in which the request to close the lock 170 is obtained from a terminal device 130.

The process 700 may be executed by the security system 100. For example, the process 700 may be implemented as a set of instructions (e.g., an application) stored in a storage device (e.g., the storage device 150 and/or a storage device of the device 140). In some embodiments, at least part of the process 700 may be performed by the processing engine 112 (implemented in, for example, the computing device 200 shown in FIG. 2) or the processing device 420 of the device 140. For illustration purposes, the implement of the process 700 on the processing device 420 is described as an example.

In 701, the processing device 420 (acquisition module 510) may obtain a request, from a terminal device 130, to close a lock 170 via, for example, the network 120. The lock 170 may be similar to the lock as described in connection with step 601, and the detailed descriptions thereof are not repeated here.

The request to close the lock 170 may be inputted by a user (e.g., an owner of a device 140, a borrower of the device 140) via the terminal device 130. In some embodiments, the user may input the request to close the lock 170 via the terminal device 130. For example, the user may press a key for closing the lock 170 in an application installed in the terminal device 130, make a sound received by the terminal device 130, scan a particular QR code using the terminal device 130, or the like. In some embodiments, the user may keep pressing the key for closing the lock 170 during the process of closing the lock 170 (e.g., during the movement of the locking mechanism toward the first position as described in connection with step 601). The user may terminate inputting the request to close the lock by releasing the key for closing the lock 170 during the process of closing the lock 170, and the lock 170 may not be locked if the user terminates the inputting.

In 702, the processing device 420 (e.g., the control module 520) may actuate an obstacle detection device 460 to detect whether an obstacle is present in a pathway of the locking mechanism between the first position and the second position. The obstacle detection device 460 may transmit the obstacle detection result to the processing module 530. Details regarding the obstacle detection device 460 may be found elsewhere in the present disclosure (e.g., FIG. 4 and the relevant descriptions thereof).

In 703, the processing device 420 (e.g., processing module 530) may determine whether an obstacle is present in the pathway of the locking mechanism based on the result of obstacle detection received from the obstacle detection device 460. Upon a result that an obstacle is present in the pathway of the locking mechanism, the process 700 may proceed to 704. On the other hand, upon a result that no obstacle is present in the pathway of the locking mechanism, the process 700 may proceed to 705.

In 704, the processing device 420 (the transmission module 540) may transmit a message indicating that the obstacle is present in the pathway of the locking mechanism to the terminal device 130 via the communication port 430 and the network 120. The message may be a text message, a voice message, a graph message, a phone call, or the like.

In 705, the processing device 420 (e.g., the control module 520) may actuate a control device 450 to cause the locking mechanism to move toward the first position such that the lock 170 may be in the locked status. Step 705 may be similar to step 606 described elsewhere in this disclosure, and the detailed descriptions thereof are not repeated here.

In 706, the processing device 420 (e.g., processing module 530) may determine whether a request to abort the request to close the lock 170 is obtained during the movement of the locking mechanism toward the first position. Upon a result of the determination that the request to abort is obtained, the process 700 may proceed to 710. On the other hand, upon a result of the determination that the request to abort is not obtained, the process 700 may proceed to 707. The request to abort may be inputted by the user via the terminal device 130 and obtained by the communication port 430 and/or the acquisition module 510. In some embodiments, the user may enter the abort request via the terminal device 130. For example, the user may press a key for abort closing the lock 170 in an application installed in the terminal device 130, make a sound received by the terminal device 130, scan a particular QR code using the terminal device 130, or the like. In some embodiments, the user may keep pressing the key for closing the lock 170 during the movement of the locking mechanism toward the first position. The user may enter the abort request by releasing the key for closing the lock 170 during the movement of the locking mechanism toward the first position.

In 707, the processing device 420 (e.g., the control module 520) may actuate the status detection device 440 to determine whether the lock 170 is in the locked status. In some embodiments, step 707 may be performed at a certain time after step 706. For example, the status detection device 440 may determine whether the lock 170 is in the locked status 30 seconds after the control module 520 actuates the control device 450 to cause the locking mechanism to move toward the first position. Step 707 may be similar to step 610, and the detailed descriptions thereof are not repeated here.

In 708, the processing device 420 (e.g., processing module 530) may determine whether the lock 170 is in the locked status based on the result of the status detection from the status detection 440. Upon a result that the lock 170 is in the locked status, the process 700 may proceed to 709. Upon a result that the lock 170 is not in the locked status, the process 700 may proceed to 710.

In 709, the transmission module 540 may transmit a message indicating that the lock 170 is locked to the terminal device 130 via the communication port 430 and the network 120. The message may be a text message, a voice message, a phone call, a graph message, a sound, or the like.

In 710, transmission module 540 may transmit a message indicating that the lock 170 is opened to the terminal device 130 via the communication port 430 and the network 120. The message may be a text message, a voice message, a phone call, a graph message, a sound, or the like.

In some embodiments, the process 700 may be accomplished with one or more additional operations and/or without one or more of the operations discussed. For example, one or more steps of steps 702, 704, 706, 709 or 710 may be omitted. As another example, the process 700 may include one or more additional operations as described in connection with FIG. 6. In some embodiments, after 705, the processing device 420 may implement steps 607 to 609. In some embodiments, after 705, the processing device 420 may implement step 605 generate a warning of the obstacle.

It should be noted that the above description of the process 700 is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
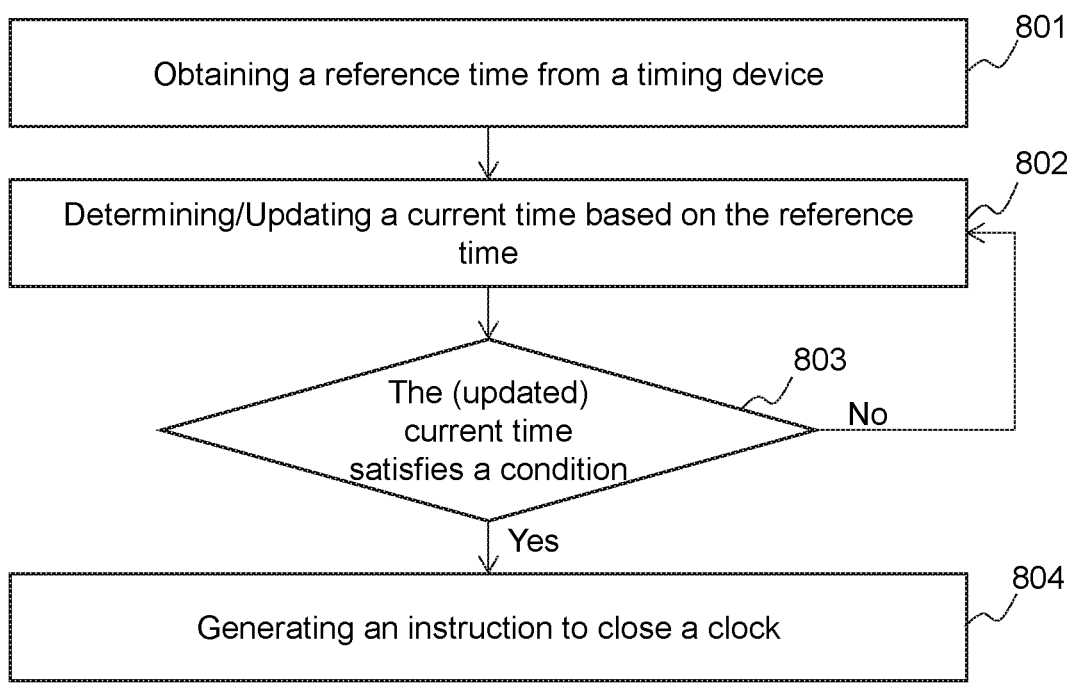
FIG. 8 is a flowchart illustrating an exemplary process for generating an instruction to close a lock according to some embodiments of the present disclosure.

FIG. 8 is a flowchart illustrating an exemplary process for generating an instruction to close a lock according to some embodiments of the present disclosure. In some embodiments, step 601 may be performed according to process 800. The process 800 may be executed by the security system 100. For example, the process 800 may be implemented as a set of instructions (e.g., an application) stored in in a storage device (e.g., the storage device 150 and/or a storage device of the device 140). In some embodiments, at least part of the process 600 may be performed by the processing engine 112 (implemented in, for example, the computing device 200 shown in FIG. 2) or the processing device 420 of the device 140. For illustration purposes, the implement of the process 800 on the processing device 420 is described as an example.

In 801, the processing device 420 (acquisition module 510) may obtain a reference time from the timing device 480. The reference time may be a time point related to a certain event. For example, the reference time may be a time point when the acquisition module 510 receives a request to borrow (or rent) the device 140 or a request to return the device 140 inputted by a user via the terminal device 130.

In some embodiments, the timing device 480 may include a clock chip and a crystal oscillator. The crystal oscillator may keep track of the current time, and the clock chip may transmit the current time to the processing device 420. For example, the reference time may be the time point when the acquisition module 510 receives the request to return the device 140 inputted by the user via the terminal device 130. When the acquisition module 510 receives the request to return the device 140, the clock chip may transmit the current time to the processing device 420, and the current time may further serve as the reference time for the processing device 420.

In 802, the processing device 420 (e.g., the processing module 530) may determine a current time base on the reference time. The processing module 530 may start to time after receiving the reference time from the timing device 480 to determine the current time. For example, when the acquisition module 510 receives the request to return the device 140 from a user, the clock chip may transmit the current time (i.e., the reference time) to the processing device 420, and the processing module 530 may start to time after receiving the reference time and update, continuously or periodically, the current time based on the time lapsed. Merely by way of example, when the acquisition module 510 receives the request to return the device 140, the clock chip may transmit the current time, 3:00 p.m., to the processing device 420, and the processing module 530 may start to time. The processing module 530 may also update the current time as 3:10 p.m. if 10 minutes lapsed.

In 803, the processing device 420 (e.g., the processing module 530) may determine whether the current time satisfies a condition to close the lock 170. The condition to close the lock 170 may be set manually or be determined by one or more components of the security system 100 (e.g., the processing module 530) according to different situations. For example, the condition may be that the current time is within a certain period. Merely by way of example, the condition may be that the current time is within the period from 01:00 a.m. to 6:00 a.m. If the current time is within the certain period, the processing module 530 may determine that the condition to close the lock 170 is satisfied. If the current time is not within the certain period, the processing module 530 may determine that the condition to close the lock 170 is not satisfied. The certain period may be any suitable period. In some embodiments, the certain period may be a period when the most users (e.g., borrowers of the devices 140) are not likely to use the device 140. For example, the certain period may be 01:00 a.m. to 6:00 a.m., 2:00 a.m. to 3:00 a.m., or the like. Additionally or alternatively, the condition may be that the difference between the current time and the reference time equals or exceeds a threshold period. When the difference between the current time and the reference time equals or exceeds the threshold period, the processing module 530 may determine that the condition to close the lock 170 is satisfied. When the difference between the current time and the reference time is less than the threshold period, the processing module 530 may determine that the condition to close the lock 170 is not satisfied. For example, the reference time may be the time point when the acquisition module 510 receives the request to return the device 140 inputted by the user via the terminal device 130, and the processing module 530 may determine that the condition is satisfied after the acquisition module 510 receives the request to return the device 140 for a period threshold. The period threshold may be any suitable value, such as 30 minutes, 1 hour, or 2 hours.

Upon a result of the determination that the current time satisfies the condition, the process 800 may proceed to 804. Upon a result of the determination that the current time does not satisfy the condition, the process 800 may proceed to 802 to update the current time. Further, the processing module 530 may determine whether the updated current time satisfies the condition to close the lock 170. Upon a result of the determination that the updated current time satisfies the condition, the process 800 may proceed to step 804. Upon a result of the determination that the updated current time does not satisfy the condition, the process 800 may proceed to 802 again.

In 804, the processing device 420 (e.g., the processing module 530) may generate an instruction to close the lock 170. The processing module 530 may transmit the instruction to one or more components of the security system 100. For example, the processing module 530 may transmit the instruction the control device 450 to actuate the control device 450 to close the lock 170. Additionally or alternatively, the processing module 530 may transmit the instruction to the acquisition module 510 as described elsewhere in this disclosure in connection with step 601.

In some embodiments, the process 800 may be accomplished with one or more additional operations, and/or without one or more of the operations discussed. For example, steps 801 and 802 may be omitted. The processing device 420 may obtain the current time from the timing device 480 periodically (e.g., in every 10 minutes), and determine whether the current time satisfies the condition to close the lock 170 in 803.

It should be noted that the above description of the process 800 is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
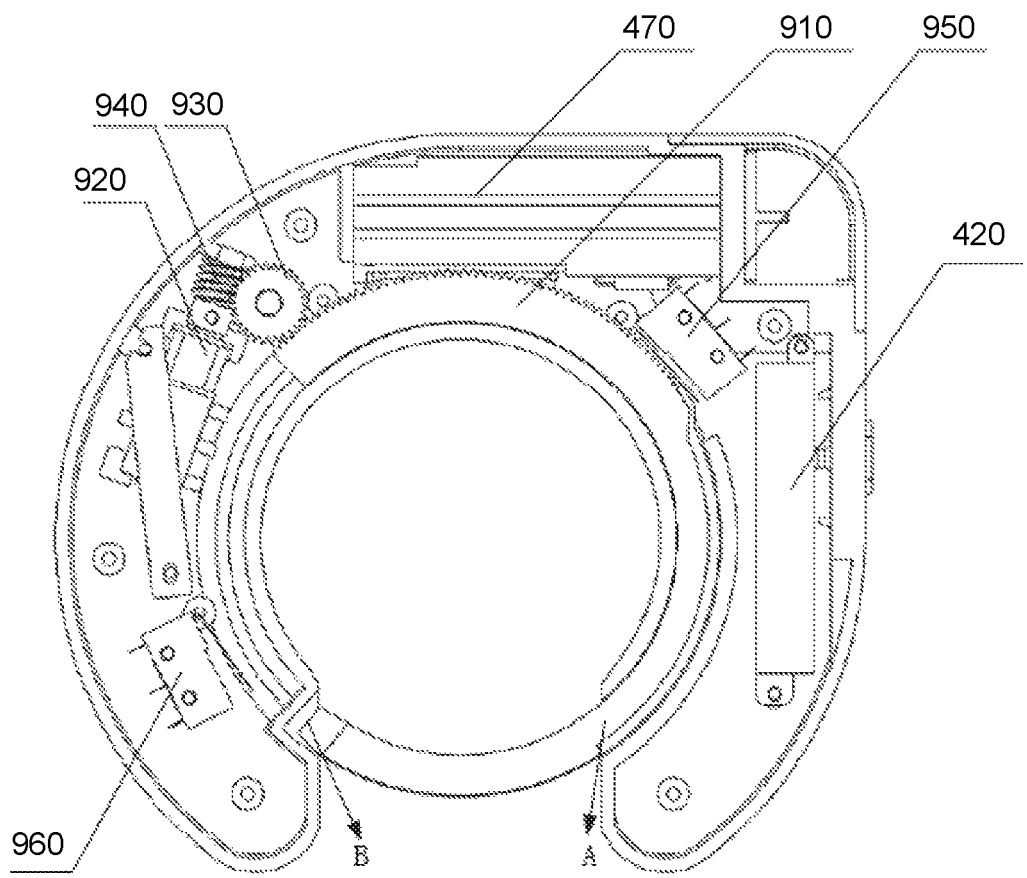
FIG. 9 is a schematic diagram illustrating an exemplary lock according to some embodiments of the present disclosure.

FIG. 9 is a schematic diagram illustrating an exemplary lock according to some embodiments of the present disclosure. The lock 900 may be an embodiment of the lock 170 as described elsewhere in this disclosure (e.g., FIGS. 4 to 8 and the relevant descriptions thereof). In some embodiments, the lock 900 may be configured to secure a device 140 (e.g., a bicycle) to a fixed object such as a lock pillar or a rack. The lock 900 may include any combination of mechanisms to implement the functions thereof described in this disclosure.

In some embodiments, the lock 900 may include a processing device 420, a power supply 470, a locking mechanism 910, a control device, and a status detection device.

The processing device 420 may process information and/or instruction related to performing one or more functions as described elsewhere in this disclosure in connection with FIGS. 4 to 8. The processing device 420 may also control the operation of other components of the lock 900 (e.g., the control device, the status detection device) based on the acquired and/or the processed information and/or instruction. In some embodiments, the processing device 420 may be a circuit board.

The power supply 470 may provide the power for operations of components of the lock 900 (e.g., the processing device 470, the control device, the status detection device). In some embodiments, the power supply 470 may be a 18650 battery.

The locking mechanism 910 may include a lock tongue, a bolt, a lock cylinder, or the like. The lock mechanism 910 may be movable along a predetermined pathway. The status of the lock 900 may be changed with the movement of the locking mechanism 910. For example, the lock 900 may have a locked status when an end of the locking mechanism 910 is in the position B as illustrated in FIG. 9. The lock 900 may have an open status when the end of the locking mechanism 910 is the locking mechanism 910 is not in the position B (e.g., in the position A).

In some embodiments, the first position of the locking mechanism 910 as described elsewhere in this disclosure may be the position B. The second position the locking mechanism 910 is as described elsewhere in this disclosure may be any position other than the position B. For example, the second position may be the position A.

The control device may control the movement of the locking mechanism 910 to control the status of the lock 900 (i.e., to open or lock the lock 900). The control device may include a motor 920, a worm gear 930, and a worm 940. The motor 920 may drive the worm gear 930 to revolve in a certain direction, which may cause the worm 940 to revolve. The revolution of the worm 940 may cause the locking mechanism to move toward a certain position.

For example, the motor 920 may drive the worm gear 930 to revolve in a first direction, which may cause the worm 940 to revolve in the anticlockwise direction in FIG. 9. The revolution of worm 940 may further cause the locking mechanism 910 to move toward the position B via the gear engagement. As another example, the motor 920 may drive the worm gear 930 to revolve in the opposite direction of the first direction, which may cause the worm 940 to revolve in the clockwise direction in FIG. 9. The revolution of worm 940 may further cause the locking mechanism 910 to move toward the position A. In some embodiments, the motor 920 may be a direct-current motor.

The status detection device may determine the status of the lock 900. The status detection device may include a first switch 950 and a second switch 960. The first switch 950 may be configured to detect whether the lock 900 is in the locked status. When at least part of the locking mechanism 910 is physically connected to the first switch 950, the status detection device may determine that the lock 900 is in the locked status. In some embodiments, the first switch 950 may include a spring strip, which may have a first contact. When at least part of the locking mechanism 910 is physically connected to the first contact of the first switch 950, the status detection device may determine that the lock 900 may be in the locked status.

The second switch 960 may be configured to determine whether the lock 900 is in the open status. When the locking mechanism 910 is physically connected to the second switch 960, the status detection device may determine that the lock 900 is in the open status. In some embodiments, the second switch 960 may include a spring strip, which may include a second contact. When the locking mechanism 910 is physically connected to the second contact of the second switch 960, the status detection device may determine that the lock 900 is in the open status.

In some embodiments, the lock 900 may include only one of the first switch 950 and the second switch 960. For example, the lock 900 may only include the first switch 950. When the locking mechanism 910 is physically connected to the first switch 950 (or the first contact of the first switch 950), the lock 900 is in the locked status. When the locking mechanism 910 is not physically connected to the first switch 950 (or the first contact of the first switch 950), the status detection device may determine that the lock 900 is in the open status.

It should be noted that the lock 900 illustrated in FIG. 9 is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10A:
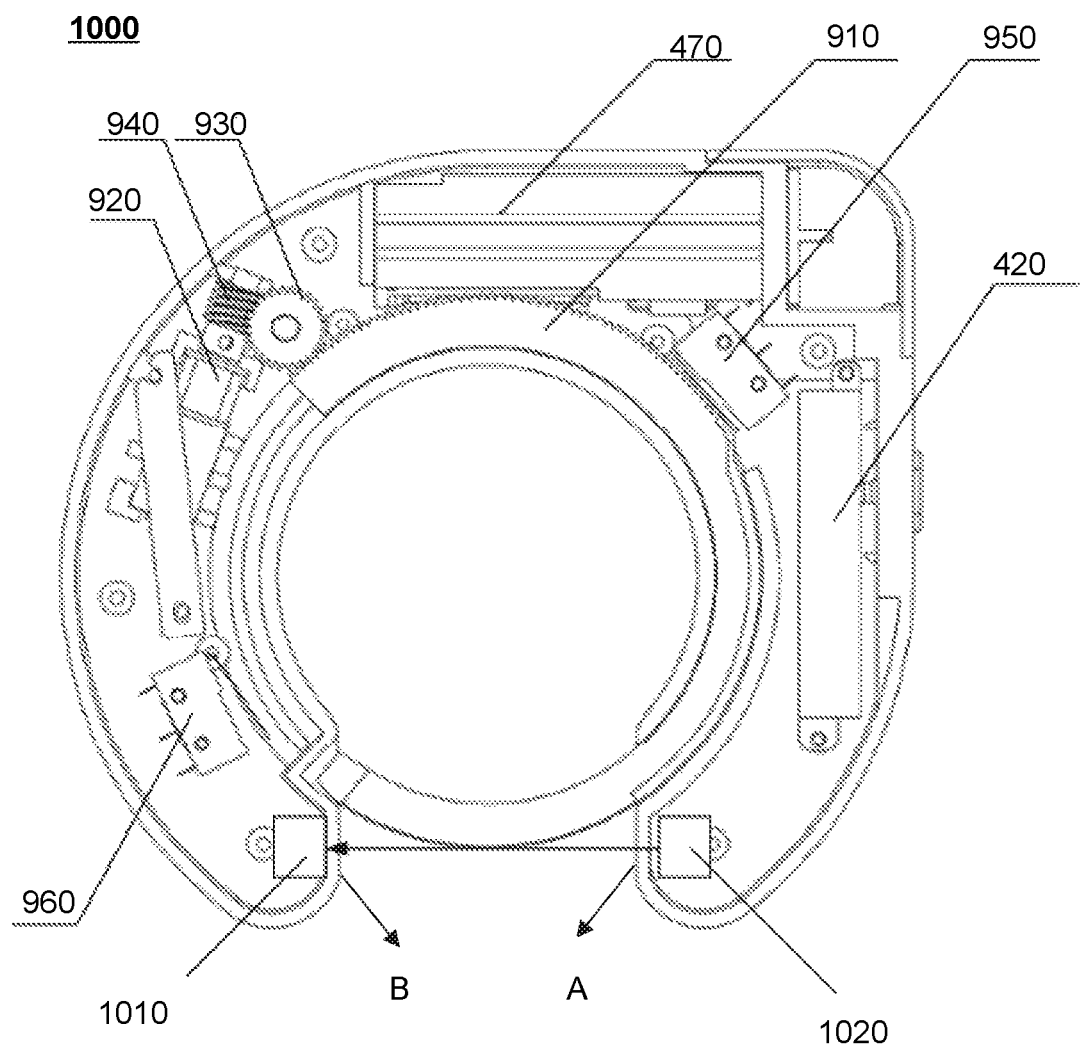
FIGS. 10A and 10B are schematic diagrams illustrating an exemplary lock according to some embodiments of the present disclosure.
Figure 10B:
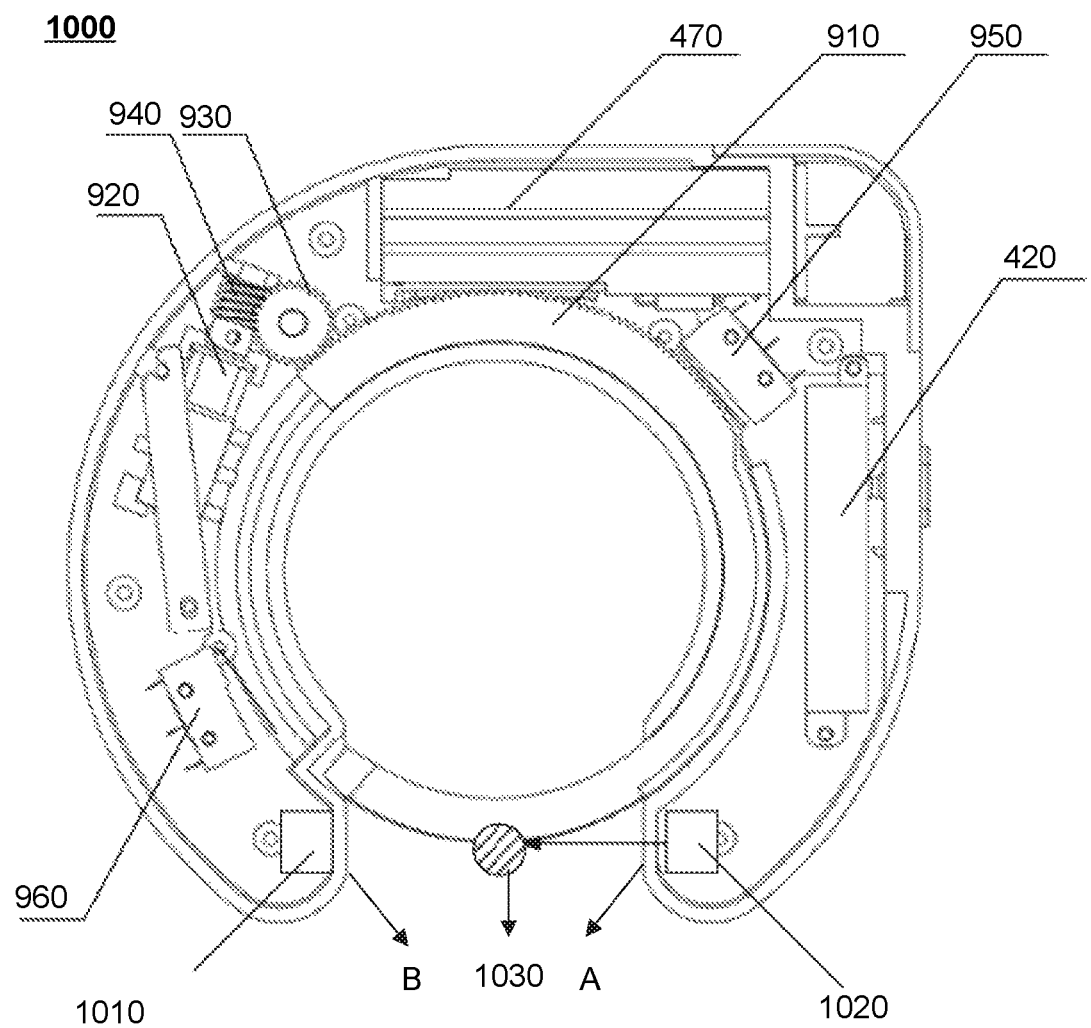

FIGS. 10A and 10B are schematic diagrams illustrating an exemplary lock according to some embodiments of the present disclosure. The lock 1000 may be similar to the lock 900 except for certain components or features.

The lock 1000 may include an obstacle detection device configured to determine whether an obstacle is present in the pathway of the locking mechanism 910 between the positions A and B. The obstacle detection device may include a signal emitting device 1010 and a signal receiving device 1020. The signal emitting device 1010 may emit a signal toward the signal receiving device 1020. The signal may include infrared light, ultraviolet light, laser light, visible light, or the like, or any combination thereof. In some embodiments, the signal emitting device 1010 may be an infrared emitter and the signal receiving device 1020 may be an infrared receiver.

The signal emitting device 1010 may be mounted in or near the position B corresponding to the locked status of the lock 1000. The signal receiving device 1020 may be mounted in or near the position A corresponding to the open status of the lock 1000. Alternatively, the signal emitting device 1010 may be mounted in or near the position A and the receiving device 1020 may be mounted in or near the position B.

If an obstacle is not present in the pathway of the locking mechanism 910 between the positions A and B as illustrated in FIG. 10A, the signal emitted by the signal emitting device 1010 may be received by the signal emitting device 1010. The obstacle detection device may determine that no obstacle is present if the signal receiving device 1020 receives the signal emitted by signal emitting device 1010.

When an obstacle (e.g., an obstacle 1030) is present in the pathway of the locking mechanism 910 as illustrated in FIG. 10B, it may completely or partially block the signal. The obstacle detection device may determine that an obstacle is present in the pathway of the locking mechanism 910 if the signal receiving device 1010 receives no or weak signal.

In some embodiments, the lock 900 or the lock 1000 may include one or more additional components and/or without one or more of the components discussed. For example, the status detection device and/or the obstacle detection device may be omitted. As another example, the processing device 420 and/or the power source 470 may be integrated into a device (e.g., a bicycle) on which the lock 900 or the lock 1000 is mounted on.

It should be noted that the examples illustrated in FIG. 9 to FIG. 11 are provided for illustration, and not intended to limit the scope of the present disclosure. For persons having ordinary skills in the art, steps may be combined in various ways or switched with other steps. Various variations and modifications may be conducted after understanding the process. However, those variations and modifications may not depart from the spirit and scope of this disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
a lock including a locking mechanism, the locking mechanism be configured to move between a first position and a second position, the lock having a locked status under which the locking mechanism is in the first position and an open status under which the locking mechanism is in the second position;
a control device configured to cause the locking mechanism to move between the first position and the second position;
a storage device storing a set of instructions; and
at least one processor in communication with the storage device, wherein when executing the instructions, the at least one processor is configured to cause the system to:
obtain a request to close the lock such that the lock is in the locked status;
actuate the control device to cause the locking mechanism to move toward the first position;
obtain, during the movement of the locking mechanism toward the first position, operation information of the lock;
determine whether the operation information of the lock satisfies a condition relating to an operation of the lock; and
actuate the control device to cause the locking mechanism to move to the first position or the second position based on a result of the determination as to whether the operation information of the lock satisfies the condition, wherein
the operation information of the lock includes a number of times of actuating the control device to close the lock; and
the condition is that the number of times of actuating the control device to close the lock equals or exceeds a threshold number.

2. The system of claim 1, the system further including a status detection device configured to determine whether the lock is in the open status or locked status, wherein to actuate the control device to close the lock, the at least one processor is configured to cause the system to:
actuate the status detection device to determine whether the lock is in the locked status; and
actuate the control device to cause the locking mechanism to move toward the first position based on a result of the determination that the lock is not in the locked status.

3. The system of claim 2, wherein the at least one processor is further configured to cause the system to:
actuate the status detection device to determine whether the lock is in the locked status; and
in response to a result of the determination that the lock is in the locked status, transmit, to a terminal device, a message indicating that the lock is locked.

4. The system of claim 2, the status detection device including a first switch, wherein to detect whether the lock is in the open status or locked status, the status detection device is further configured to:
determine whether at least a part of the lock mechanism is physically connected to the first switch; and
determine, based on a result of the determination that at least a part of the lock mechanism is physically connected to the first switch, that the lock is in the locked status.

5. The system of claim 4, the status detection device further including a second switch, wherein to detect whether the lock is in the open status or locked status, the status detection device is further configured to:
determine whether at least a part of the lock mechanism is physically connected to the second switch; and
determine, based on a result of the determination that at least a part of the lock mechanism is physically connected to the second switch, that the lock is in the open status.

6. The system of claim 2, the status detection device including a switch, wherein to detect whether the lock is in the open status or locked status, the status detection device is further configured to:
determine whether at least a part of the lock mechanism is physically connected to the switch; and
determine, based on a result of the determination that at least a part of the lock mechanism is not physically connected to the switch, that the lock is in the open status.

7. The system of claim 1, the system further including an obstacle detection device configured to detect whether an obstacle is present in a pathway of the locking mechanism between the first position and the second position, wherein to actuate the control device to close the lock, the at least one processor is configured to cause the system to:
actuate the obstacle detection device to detect whether an obstacle is present in the pathway of the locking mechanism between the first position and the second position; and
actuate the control device to close the lock in response to a result of the detection that no obstacle is present in the pathway between the first position and the second position.

8. The system of claim 1, wherein the operation information of the lock also includes a request to abort the request to close the lock, and to determine whether the operation information of the lock satisfies the condition relating to an operation of the lock, the at least one processor is further configured to cause the system to:

obtain the request to abort the request to close the lock; and determine, based on the obtained request to abort, that the operation information of the lock satisfies the condition.

9. The system of claim 1, wherein to determine whether the operation information of the lock satisfies the condition relating to an operation of the lock, the at least one processor is further configured to cause the system to:

determine whether the number of times of actuating the control device to close the lock equals or exceeds the threshold number; and determine, based on a result of the determination that the number of times of actuating the control device to close the lock equals or exceeds the threshold number, the operation information of the lock satisfies the condition.

10. The system of claim 1, wherein the operation information of the lock also includes a duration of closing the lock, and to determine whether the operation information of the lock satisfies the condition relating to an operation of the lock, the at least one processor is further configured to cause the system to:

determine whether the duration of closing the lock equals or exceeds a threshold period, and determine, based on a result of the determination that the duration of closing the lock equals or exceeds the threshold period, the operation information of the lock satisfies the condition.

11. The system of claim 1, wherein to obtain the request to close the lock such that the lock is in the locked status, the at least one processor is further configured to cause the system to:

obtain a reference time from a timing device;

determine, based on the obtained reference time, a current time;

determine whether the current time satisfies a condition to close the lock; and generate the request to close the lock based on a result of the determination that the current time satisfies the condition to close the lock.

12. A method implemented on a computing device having one or more processors and one or more storage media, the method comprising:

obtaining a request to close a lock such that the lock is in a locked status, the lock including a locking mechanism, the locking mechanism be configured to move between a first position and a second position, the lock having the locked status under which the locking mechanism is in the first position and an open status under which the locking mechanism is in the second position;

actuating a control device to cause the locking mechanism to move toward the first position;

obtaining, during the movement of the locking mechanism toward the first position, operation information of the lock;

determining whether the operation information of the lock satisfies a condition relating to an operation of the lock; and actuating the control device to cause the locking mechanism to move to the first position or the second position based on a result of the determination as to whether the operation information of the lock satisfies the condition, wherein the operation information of the lock includes a number of times of actuating the control device to close the lock; and the condition is that the number of times of actuating the control device to close the lock equals or exceeds a threshold number.

13. The method of claim 12, wherein the actuating the control device to close the lock further comprises:

actuating a status detection device to determine whether the lock is in the locked status or open status;

actuating the control device to cause the locking mechanism to move toward the first position based on a result of the determination as to whether the lock is not in the locked status or open status;

actuating the status detection device to determine whether the lock is in the locked status; and in response to a result of the determination that the lock is in the locked status, transmitting, to a terminal device, a message indicating that the lock is locked.

14. The method of claim 13, wherein the status detection device includes a first switch and a second switch, and the actuating the status detection device to determine whether the lock is in the locked status or open status further comprises:

determining whether at least a part of the lock mechanism is physically connected to the first switch; and determining, based on a result of the determination that at least a part of the lock mechanism is physically connected to the first switch, that the lock is in the locked status;

determining whether at least a part of the lock mechanism is physically connected to the second switch; and determining, based on a result of the determination that at least a part of the lock mechanism is physically connected to the second switch, that the lock is in the open status.

15. The method of claim 13, wherein the status detection device includes a switch, the actuating the status detection device to determine whether the lock is in the locked status or the open status further comprises:

determining whether at least a part of the lock mechanism is physically connected to the switch; and determining, based on a result of the determination that at least a part of the lock mechanism is not physically connected to the switch, that the lock is in the open status.

16. The method of claim 12, wherein the actuating the control device to close the lock further comprises:

actuating an obstacle detection device to detect whether an obstacle is present in the pathway of the locking mechanism between the first position and the second position; and actuating the control device to close the lock in response to a result of the detection that no obstacle is present in the pathway between the first position and the second position.

17. The method of claim 12, wherein the operation information of the lock also includes a request to abort the request to close the lock, and the determining whether the operation information of the lock satisfies the condition relating to an operation of the lock further comprises:

obtaining the request to abort the request to close the lock; and determining, based on the obtained request to abort, that the operation information of the lock satisfies the condition.

18. The method of claim 12, the determining whether the operation information of the lock satisfies the condition relating to an operation of the lock further comprising:
  determining whether the number of times of actuating the control device to close the lock equals or exceeds the threshold number; and
  determining, based on a result of the determination that the number of times of actuating the control device to close the lock equals or exceeds the threshold number, the operation information of the lock satisfies the condition.

19. The method of claim 12, wherein the operation information of the lock also includes a duration of closing the lock, and the determining whether the operation information of the lock satisfies the condition relating to an operation of the lock further comprising:
  determining whether the duration of closing the lock equals or exceeds a threshold period, and
  determining, based on a result of the determination that the duration of closing the lock equals or exceeds the threshold period, the operation information of the lock satisfies the condition.

20. A non-transitory computer-readable storage medium storing instructions that, when executed by at least one processor of a system, cause the system to perform a method, the method comprising:
  obtaining a request to close a lock such that the lock is in a locked status, the lock including a locking mechanism, the locking mechanism be configured to move between a first position and a second position, the lock having the locked status under which the locking mechanism is in the first position and an open status under which the locking mechanism is in the second position;
  actuating a control device to cause the locking mechanism to move toward the first position;
  obtaining, during the movement of the locking mechanism toward the first position, operation information of the lock;
  determining whether the operation information of the lock satisfies a condition relating to an operation of the lock; and
  actuating the control device to cause the locking mechanism to move to the first position or the second position based on a result of the determination as to whether the operation information of the lock satisfies the condition, wherein
    the operation information of the lock includes a number of times of actuating the control device to close the lock; and
    the condition is that the number of times of actuating the control device to close the lock equals or exceeds a threshold number.

* * * * *